Sept. 21, 1965 S. POLLAND 3,207,030

MOVABLE COPY HOLDER AND LIGHT SOURCE IN A COPY CAMERA

Filed Jan. 19, 1962 20 Sheets-Sheet 1

Inventor:
Sophia Polland
BY Jacobi & Davidson
Attorneys.

Sept. 21, 1965 S. POLLAND 3,207,030

MOVABLE COPY HOLDER AND LIGHT SOURCE IN A COPY CAMERA

Filed Jan. 19, 1962 20 Sheets-Sheet 2

Inventor:
Sophia Polland
BY Jacobi & Davidson
Attorneys.

Sept. 21, 1965 S. POLLAND 3,207,030

MOVABLE COPY HOLDER AND LIGHT SOURCE IN A COPY CAMERA

Filed Jan. 19, 1962 20 Sheets-Sheet 3

Inventor:
Sophia Polland
BY Jacobi & Davidson
Attorneys.

MOVABLE COPY HOLDER AND LIGHT SOURCE IN A COPY CAMERA

Filed Jan. 19, 1962

Inventor:
Sophia Polland
BY Jacobi & Davidson
Attorneys.

Sept. 21, 1965 S. POLLAND 3,207,030

MOVABLE COPY HOLDER AND LIGHT SOURCE IN A COPY CAMERA

Filed Jan. 19, 1962 20 Sheets-Sheet 5

Inventor:
Sophia Polland
BY Jacobi & Davidson
Attorneys.

MOVABLE COPY HOLDER AND LIGHT SOURCE IN A COPY CAMERA

Filed Jan. 19, 1962

Inventor:
Sophia Polland
BY Jacobi & Davidson
Attorneys.

MOVABLE COPY HOLDER AND LIGHT SOURCE IN A COPY CAMERA

Filed Jan. 19, 1962

Inventor:
Sophia Polland
BY Jacobi & Davidson
Attorneys.

MOVABLE COPY HOLDER AND LIGHT SOURCE IN A COPY CAMERA

Filed Jan. 19, 1962

Inventor:
Sophia Polland

BY Jacobi & Davidson
Attorneys.

MOVABLE COPY HOLDER AND LIGHT SOURCE IN A COPY CAMERA

Filed Jan. 19, 1962 20 Sheets-Sheet 9

Inventor:
Sophia Polland
BY Jacobi & Davidson
Attorneys.

Sept. 21, 1965 S. POLLAND 3,207,030

MOVABLE COPY HOLDER AND LIGHT SOURCE IN A COPY CAMERA

Filed Jan. 19, 1962 20 Sheets-Sheet 10

Inventor:
Sophia Polland
BY Jacobi & Davidson
Attorneys.

MOVABLE COPY HOLDER AND LIGHT SOURCE IN A COPY CAMERA

Filed Jan. 19, 1962 20 Sheets-Sheet 11

Inventor:
Sophia Polland
BY Jacobi & Davidson
Attorneys.

Sept. 21, 1965 S. POLLAND 3,207,030

MOVABLE COPY HOLDER AND LIGHT SOURCE IN A COPY CAMERA

Filed Jan. 19, 1962 20 Sheets-Sheet 12

Inventor:
Sophia Polland
BY Jacobi & Davidson
Attorneys.

MOVABLE COPY HOLDER AND LIGHT SOURCE IN A COPY CAMERA

Filed Jan. 19, 1962

Inventor:
Sophia Polland
BY Jacobi & Davidson
Attorneys.

Inventor:
Sophia Polland
BY Jacobi & Davidson
Attorneys.

Inventor:
Sophia Polland
BY Jacobi & Davidson
Attorneys.

MOVABLE COPY HOLDER AND LIGHT SOURCE IN A COPY CAMERA

Filed Jan. 19, 1962 20 Sheets-Sheet 16

Inventor:
Sophia Polland
BY Jacobi & Davidson
Attorneys.

Sept. 21, 1965 S. POLLAND 3,207,030

MOVABLE COPY HOLDER AND LIGHT SOURCE IN A COPY CAMERA

Filed Jan. 19, 1962 20 Sheets-Sheet 17

INVENTOR.
Sophia Polland
BY Jacobi & Davidson
ATTORNEYS.

MOVABLE COPY HOLDER AND LIGHT SOURCE IN A COPY CAMERA

Filed Jan. 19, 1962 20 Sheets-Sheet 18

INVENTOR.
Sophia Polland
BY Jacobi & Davidson
ATTORNEYS.

Sept. 21, 1965 S. POLLAND 3,207,030

MOVABLE COPY HOLDER AND LIGHT SOURCE IN A COPY CAMERA

Filed Jan. 19, 1962 20 Sheets-Sheet 19

INVENTOR.
Sophia Polland
BY Jacobi & Davidson
ATTORNEYS.

INVENTOR.
Sophia Polland
BY Jacobi & Davidson
ATTORNEYS.

3,207,030

MOVABLE COPY HOLDER AND LIGHT SOURCE IN A COPY CAMERA

Sophia Polland, 3552 E. 10th Court, Hialeah, Fla.

Filed Jan. 19, 1962, Ser. No. 168,031
15 Claims. (Cl. 88—24)

Figures 1, 2:
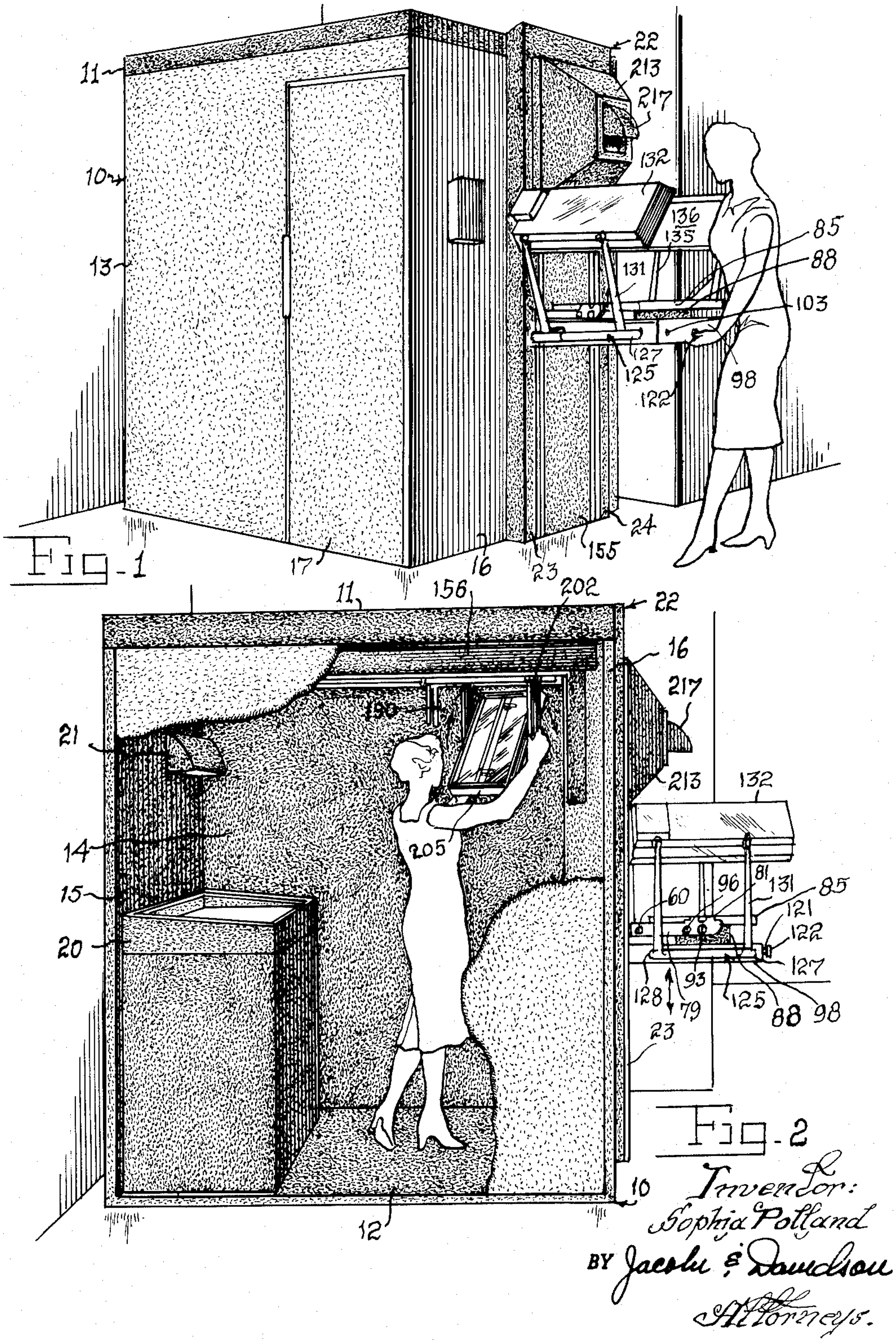

This invention relates to photography, and more particularly to a process camera which may be utilized for copying or photographing material which is to be reproduced to a larger or smaller scale, and which may also be utilized to provide an almost infinite number of variations of the original material, to provide a great variety of effects, and this apparatus finds particular use in the field of advertising, but is by no means limited to such field.

Heretofore, numerous types of process or copying cameras have been proposed and utilized, and while many of these cameras were satisfactory for the primary purpose for which they were designed, nevertheless, the uses to which such cameras might be put were somewhat limited, and in many instances an attempt to utilize these prior cameras for other than their primary intended function resulted in the use of excessive quantities of sensitized film or paper, thereby materially increasing the cost of production. Furthermore, many of these prior art cameras were limited to a mere enlargement or reduction in size of the original material within certain limits, and accordingly such cameras could not be utilized for producing special effects which would serve to vary or would distort the original material in such a manner as to provide the wide variety of effects now required by the advertising field. It is further to be noted that prior art cameras of this general nature are in the main relatively large and cumbersome as well as complex, and consequently the matter of providing space for such cameras as well as the initial cost thereof is a very material consideration.

Briefly stated, the process camera of this invention constitutes a completely self-contained and unitary structure which includes an enclosure providing a dark room in which sensitized film or paper may be handled and exposed as well as developed, fixed and washed, and included within the dark room is suitable photographic apparatus to facilitate all operations necessary in the exposure and treatment or processing of the sensitized film or paper. Also mounted within the dark room is a film or sensitized paper holder which includes a generally rectangular frame for receiving such film, and which frame may be conveniently and accurately adjusted about a horizontal axis, as well as about a vertical axis, and furthermore, the film holder is mounted on a carriage which in turn is slidably mounted on rails for horizontal movement in order to properly position the film holder with respect to a prism and lens system which is mounted in a wall of the dark room.

Exteriorly of the dark room and mounted on one wall thereof is a generally rectangular vertical frame which serves to slidably mount a copy holder on which may be supported material to be copied or reproduced, and such copy holder is positioned below and in alignment with the prism and lens system which is disposed toward the upper portion of the dark room wall on which the frame is mounted. The copy holder includes a carriage slidably mounted on the frame, together with means for maintaining the carriage horizontal, and also incorporating means for locking the carriage in any desired vertical position. The copy holder mounted on the copy holder carriage may be accurately adjusted about a horizontal axis parallel to the frame in order to position the material to be copied in any desired angular location which together with the adjustability of the film or paper holder within the dark room is an important feature of this invention, since this relative angular adjustability of the copy holder and the film holder results in providing an almost infinite number of photographic effects which can be obtained with the apparatus of this invention.

Also, associated with the copy holder and disposed below the same is a light source supporting means in the form of a carriage slidably mounted on the frame and having upstanding brackets which serve to support light source reflectors above and at opposite sides of the copy holder in a manner to adequately illuminate material disposed on the copy holder, and latch means is provided for latching the copy holder carriage and light source carriage together for simultaneous vertical movement, or if desired, such latching means may be released to permit independent movement of these mechanisms. In order to facilitate vertical movement of the copy holder and light source supporting means there is provided independent counterbalancing means for these elements, and such counterbalancing means may be housed within the frame secured to the wall of the dark room, which frame may be enclosed by a suitable panel at the front thereof in order to present a pleasing appearance, and also to prevent interference with the operation of the counterbalancing means and other mechanism contained within the confines of the frame.

The process camera of the invention may be operated by a single person who would first dispose the material on the copy holder and properly adjust the same, together with the light source means, after which the operator would retire within the dark room and properly position the film holder to produce the desired enlargement or reduction, as well as the special effect required, after which a suitable sheet of sensitized film or paper would be positioned in the film holder, and the same exposed for the necessary duration of time to light rays reflected from material on the copy holder upwardly through the prism and lens system, and along a horizontal axis to the film holder within the dark room. Upon completion of the exposure, the film or sensitized paper is removed from the film holder, and processed in accordance with the characteristics thereof to produce the desired finished photographic print. After suitable adjustment of the copy holder and light source supporting means, the entire control of the apparatus may be accomplished from within the dark room. However, in order to expedite production, the process camera of this invention may also be operated by two operators, one of whom would be outside the dark room to position material on the copy holder and properly adjust the same, as well as the lighting thereof, and the second operator stationed within the dark would appropriately adjust the film holder and control the exposure and processing of the sensitized film or paper. Obviously in this manner extremely rapid operation may be provided.

The process camera of this invention is of such a nature that the same may be manufactured and shipped in a disassembled condition in order to conserve shipping space, and upon arrival at the destination, the same may be conveniently assembled in a minimum of space without requiring the use of highly skilled personnel, since the mere assembling of the various parts will serve to provide suitable location and alignment therebetween.

The particular nature of the film holder, together with the feature of permitting an operator to be present in the dark room during operation of the camera ensures proper composing of the print to be produced, and also permits the use of a sheet of sensitized film or paper of appropriate size, which materially reduces waste and cost of operation, as opposed to cameras in which only a single size of sensitized film or paper may be utilized, regardless of the size of the print to be produced, and furthermore, the developing process may be visually observed, thereby precluding over or under development of the print. Also, by reason of this structure rapid test exposures may be made in order to determine the proper conditions for the final production operation.

It is accordingly an object of the invention to provide a process camera in the form of a completely self-contained and unitary structure incorporating a dark room of a size to admit an operator, and also including all necessary copy and film supporting means, as well as suitable illuminating means.

A further object of the invention is the provision of a process camera incorporating a dark room in which all of the elements of the camera are mounted on the walls of the dark room in order to provide a completely self-contained and unitary apparatus, which materially facilitates shipping as well as maintenance of the apparatus.

A still further object of the invention is the provision of a process camera in which any desired degree of enlargement or reduction may be provided, and also incorporating means to provide an almost infinite variety of effects, resulting in the provision in a finished print of depth, dimension or distortion, with reference to the original material photographed in the apparatus of this invention.

Another object of the invention is the provision of a process camera incorporating a dark room, and having a vertical frame secured exteriorly to one wall of the dark room, such frame serving to support a copy holder for vertical movement thereon, such copy holder including a carriage and a copy holder frame rotatably supported on the carriage for movement about a horizontal axis parallel to the plane of the frame.

A further object of the invention is the provision of a process camera including a dark room, and in which a generally rectangular vertical frame is secured to one wall of the dark room and serves to slidably support for vertical movement a copy holder carriage, there being means provided associated with the carriage and the frame for maintaining the carriage in horizontal position at all times, which feature, in addition to ensuring the horizontal position of the carriage for photographic purposes prevents binding of the same on the frame during vertical movement, regardless of whether force is applied thereto from either side during manipulation to adjust the same to the proper elevation.

A still further object of the invention is the provision of a process camera including a vertically movable copy holder carriage and a copy holder frame rotatably mounted thereon for movement about a horizontal axis, there being provided means for indicating the angular position of the copy holder frame, and also means to lock the frame in adjusted angular position.

Another object of the invention is the provision of a process camera including a vertically movable copy holder carriage, and in which means is provided for conveniently locking the carriage at any desired vertical position, such means including friction means for engaging the frame on which the copy holder is slidably mounted, thereby providing an infinite number of locations in which the copy holder may be locked in position.

Another object of the invention is the provision of a process camera including a light source carriage slidably mounted for vertical movement below the copy holder, the light source carriage incorporating frames slidably mounted thereon for movement from opposite sides of the light source carriage, such frames also including upstanding brackets which serve to pivotally support light source reflectors disposed above and to opposite sides of the copy holder.

A further object of the invention is the provision of a process camera including a vertically movable copy holder as well as a vertically movable light source supporting carriage disposed below the copy holder, and in which cooperating means is provided on the copy holder and light source carriage to latch the same together for simultaneous vertical movement, or to release the same for independent vertical movement, the light source carriage also including releasable friction means engaging the frame on which the same is slidably mounted to lock the light source carriage in any desired vertical position of adjustment, thereby permitting critical and accurate adjustment of the light source with respect to material supported on the copy holder.

A still further object of the invention is the provision of a process camera including vertically movable copy holder and light source supporting means, and independent counterbalancing means for each of the copy holder and light source means in order to facilitate and reduce the manual labor necessary in vertically adjusting these parts of the apparatus.

Another object of the invention is the provision of a process camera including a dark room, and in which horizontal rails are mounted on the top wall of the dark room, such rails serving to slidably support a film holder depending therefrom.

A further object of the invention is the provision of a process camera including a dark room in which rails are mounted on the top wall of the dark room, and serve to slidably support a film holder depending therefrom, such film holder including a carriage mounted on the rails, together with a depending handle for facilitating movement of the carriage as well as friction means for locking the carriage in an infinite number of adjusted positions, the friction means being operated by a lever associated with the depending handle.

A still further object of the invention is the provision of a process camera including a dark room, in which a film holder is mounted for horizontal movement on the top wall of the dark room, the film holder including a depending generally U-shaped frame in which the central portion thereof is mounted on a carriage for rotation about a vertical axis, there being means provided for indicating the angular position of the frame as well as means for locking the same in adjusted angular position.

Another object of the invention is the provision of a process camera including a dark room in which a film holder is mounted for slidably movement on the top wall of the dark room, such film holder including a generally U-shaped frame depending from a carriage, and a generally rectangular film holder mounted between the depending arms of the U-shaped frame for movement about a horizontal axis, the film holder being removable from the frame to permit the use of film holders of different sizes, and also incorporating means to indicate the angular position of the film holder about a horizontal axis, as well as means to lock the film holder in adjusted angular position.

A further object of the invention is the provision of a film holder for use in a process camera, such film holder comprising a generally rectangular frame having a film-supporting transparent plate therein, and in which means is provided for holding sheets of sensitized film or paper of various sizes in intimate contact with the transparent plate.

A still further object of the invention is the provision of a film holder for use in a process camera, such film holder comprising a generally rectangular frame and a film-supporting plate of transparent material, there being also provided means for holding sensitized film or paper in intimate contact with the transparent plate, such means being so designed as to permit convenient insertion or removal of the film or paper, regardless of the size thereof.

Another object of the invention is the provision of a film holder for use in a process camera, such film holder comprising a generally rectangular frame, including a transparent, film-supporting plate, there being means also provided for holding a sheet of film or paper in intimate contact with the supporting plate, such holding means being conveniently removable from the frame in order to facilitate cleaning or repair.

A further and very important object of the invention resides in the provision of a process camera in which the relative adjustability, both vertically and horizontally, as well as angularly about horizontal and vertical axes of the copy holder and film holder results in providing an apparatus in which an almost infinite variety of photographic effects may be obtained, and also in the arrangement of these components in such a manner as to permit convenient and accurate manipulation and adjustment thereof during operation, and also in an arrangement which permits the continuous observation of the process during operation, and the use of sensitized film or paper of proper size, thereby materially reducing the cost of operation, and also increasing the speed thereof.

A still further object is the provision of a process camera which may be conveniently and economically constructed from readily available materials, and which may be installed and operated in a minimum of space.

Figure 3:
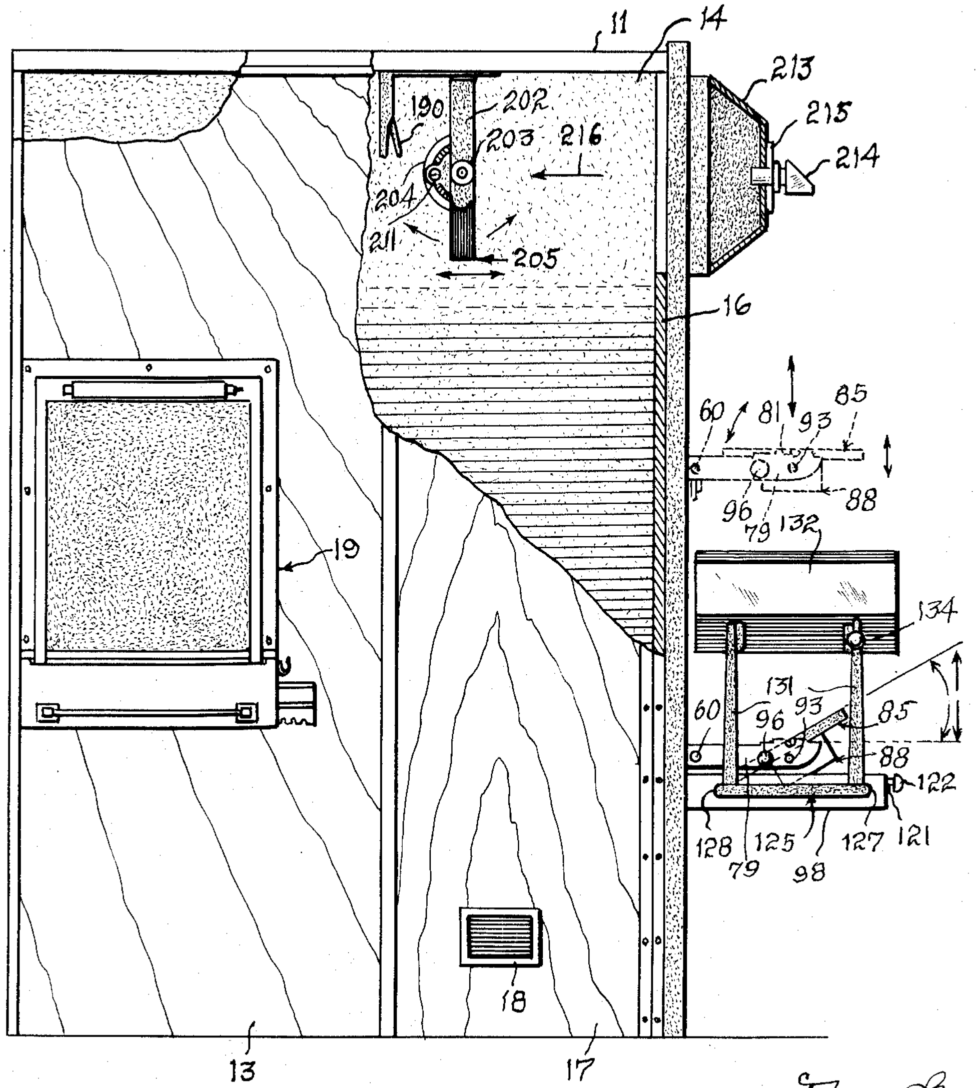
Figure 4:
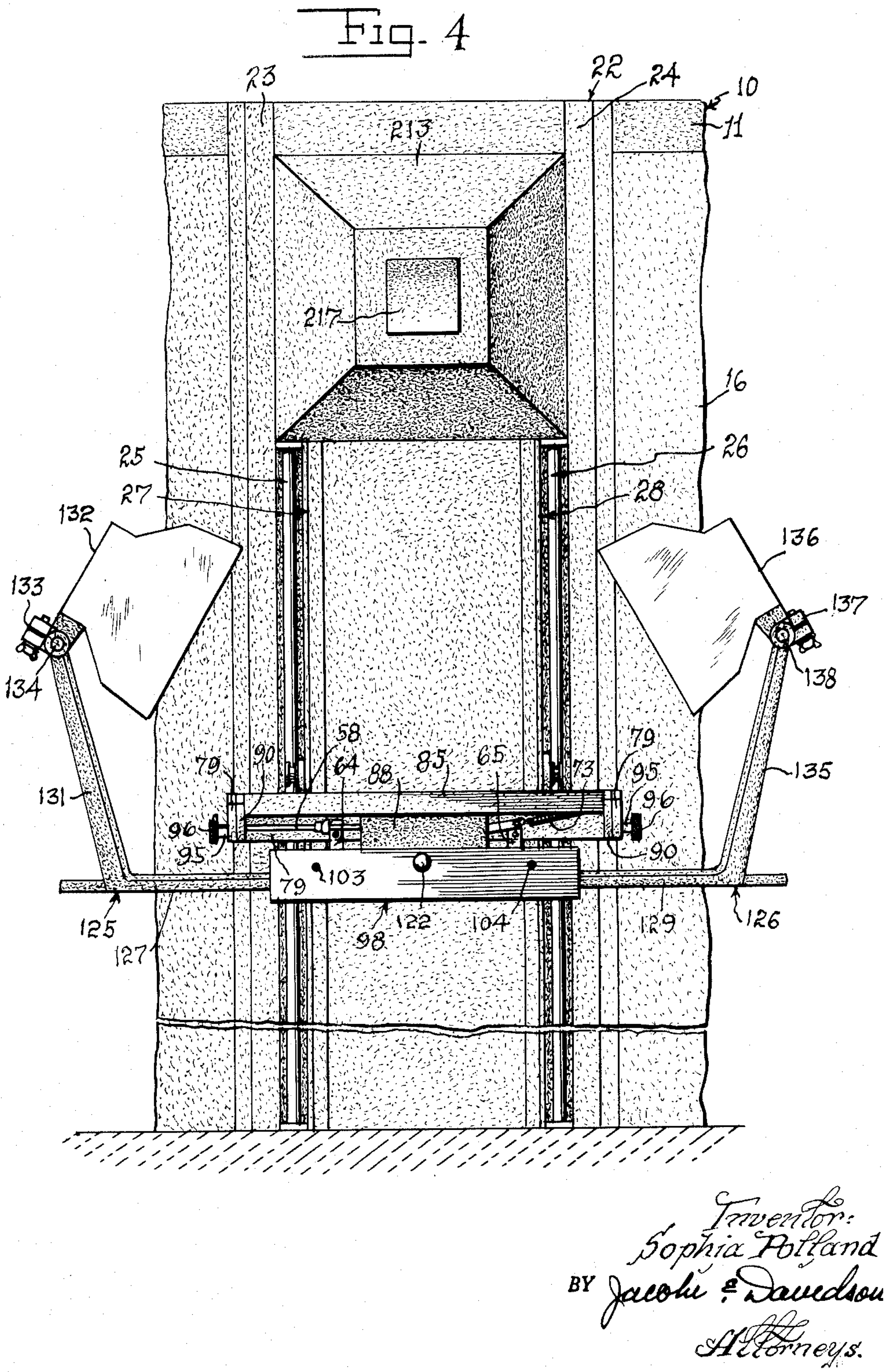
Figure 5:
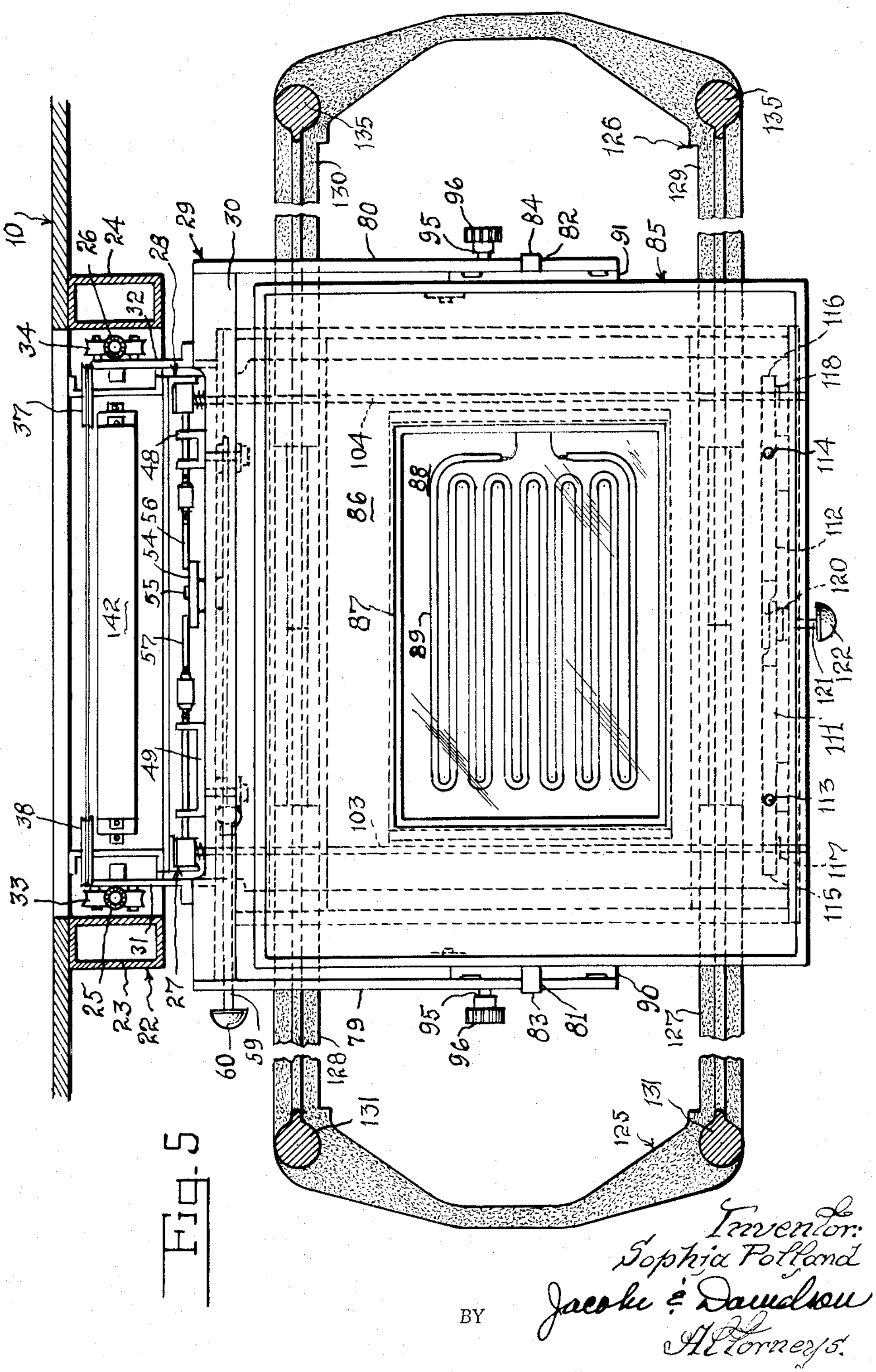
Figure 6:
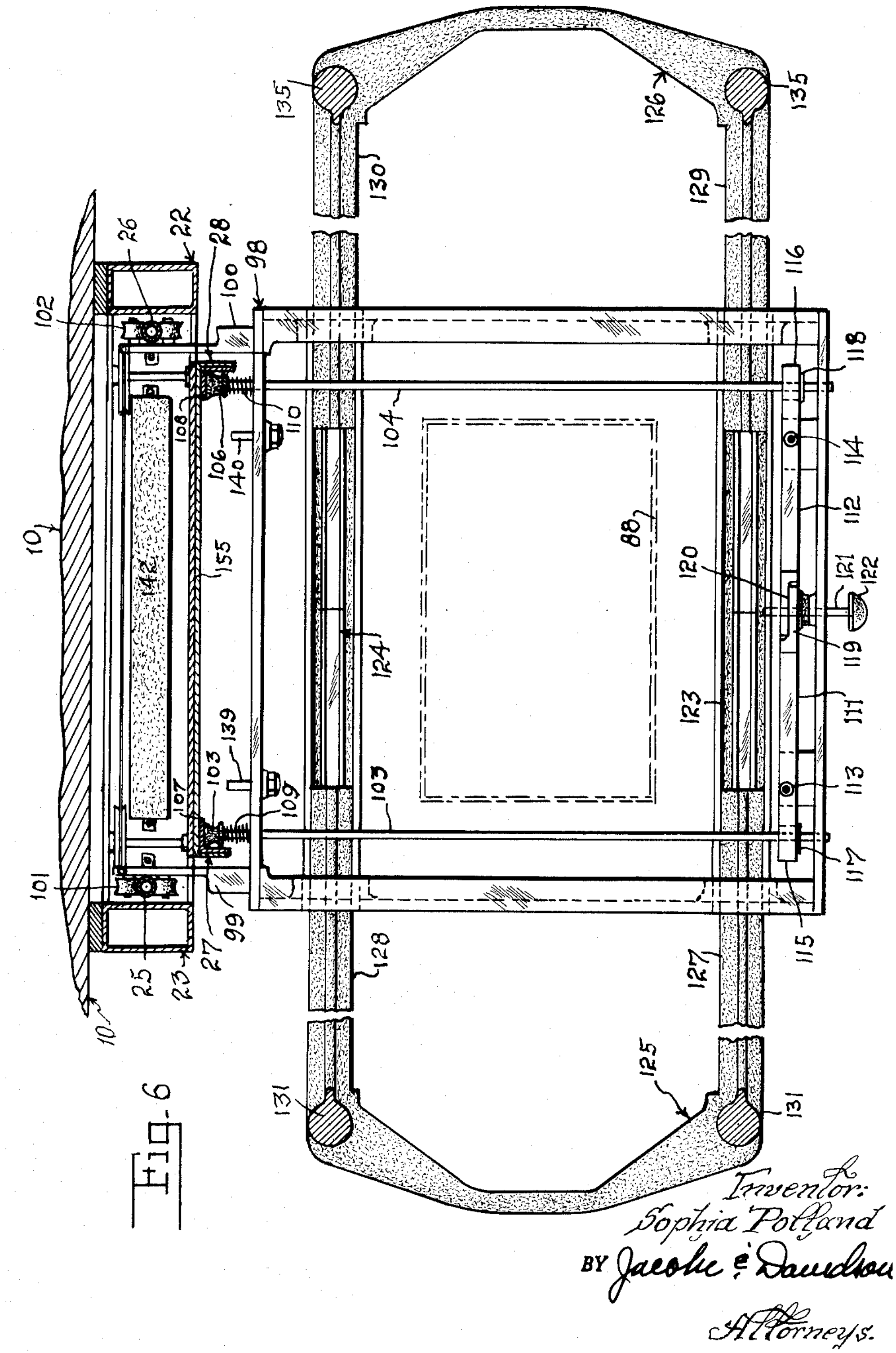
Figure 7:
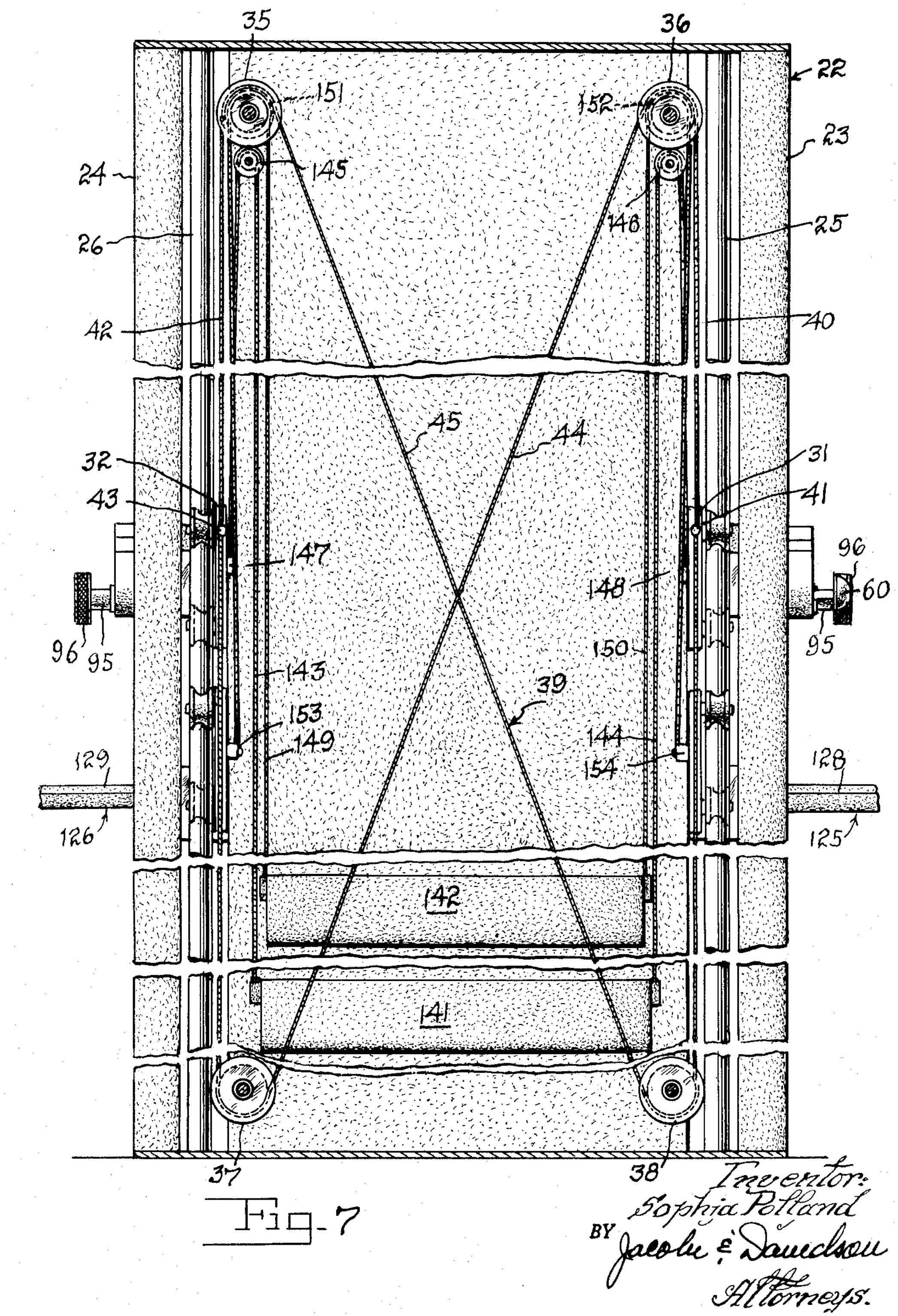
Figure 8:
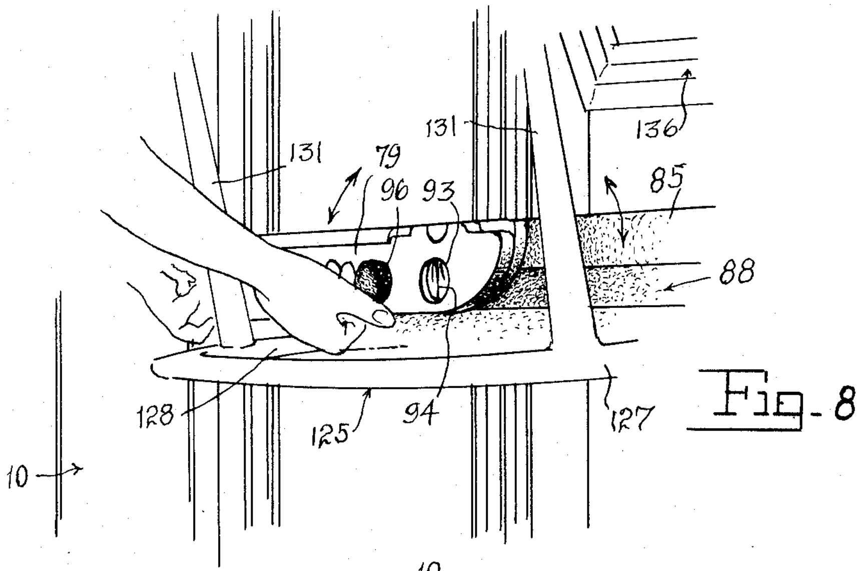
Figure 9:
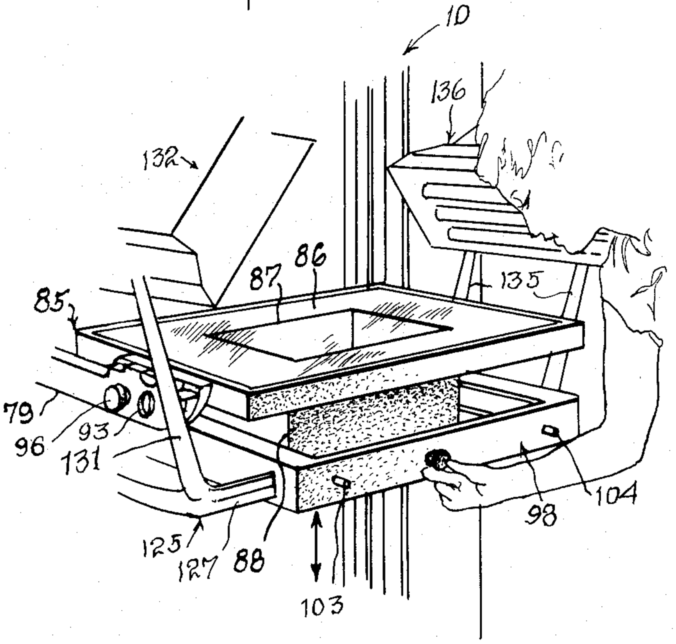
Figures 10, 11, 12:
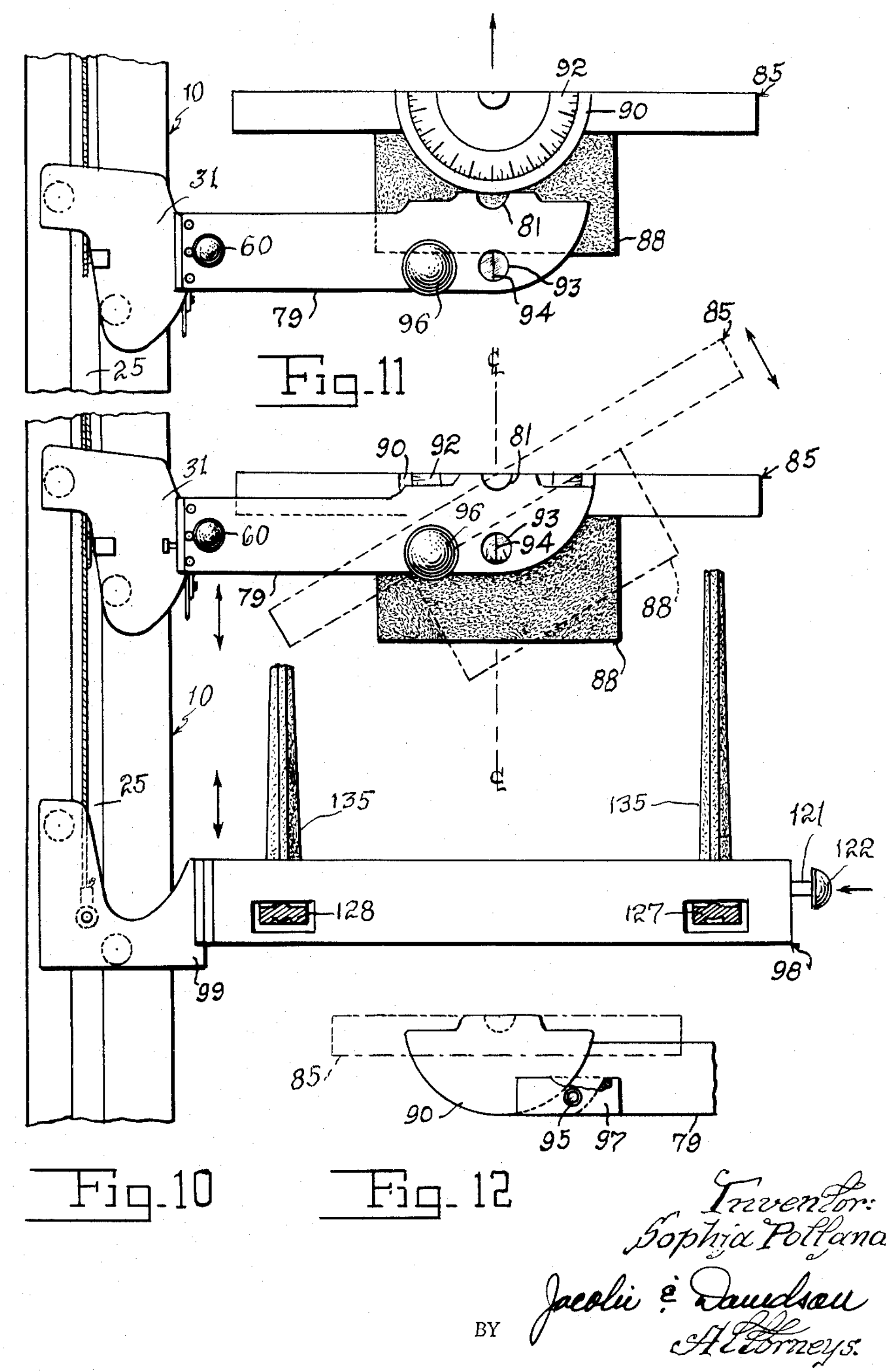
Figures 13, 14:
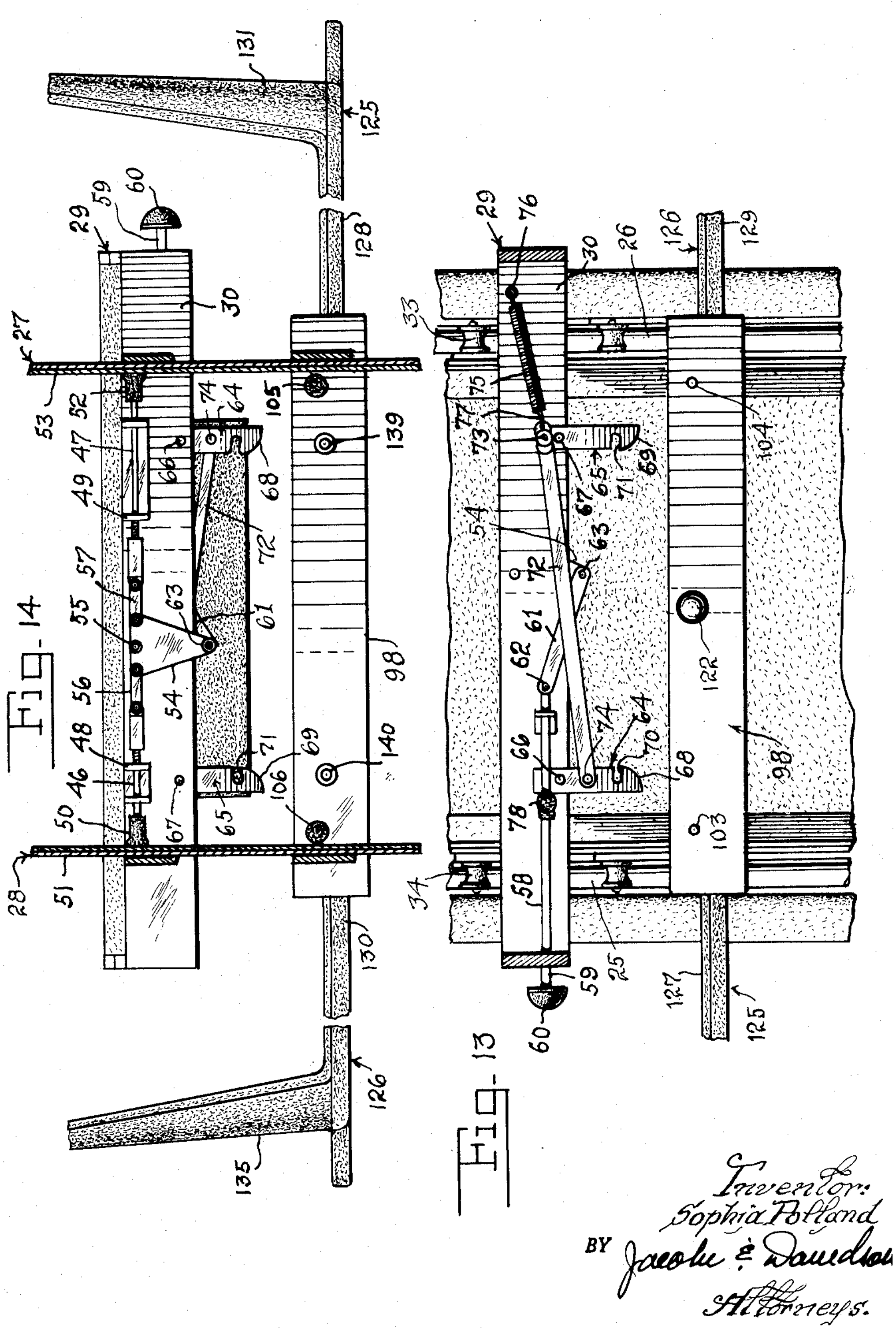
Figure 20:
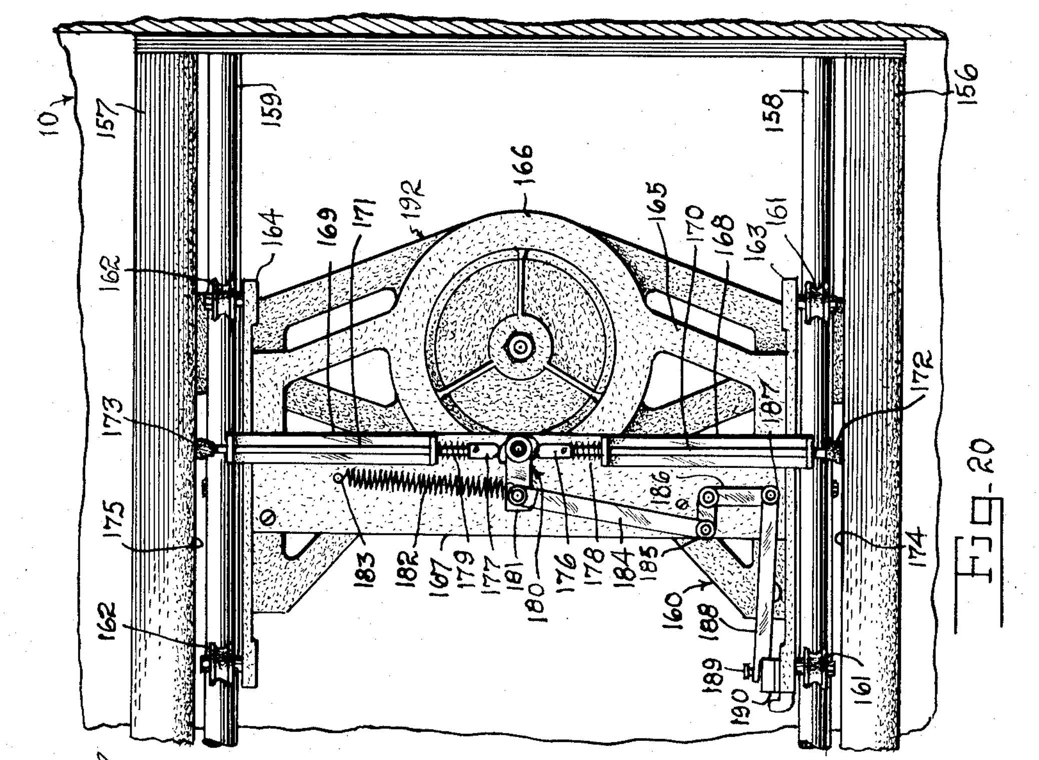
Figure 19:
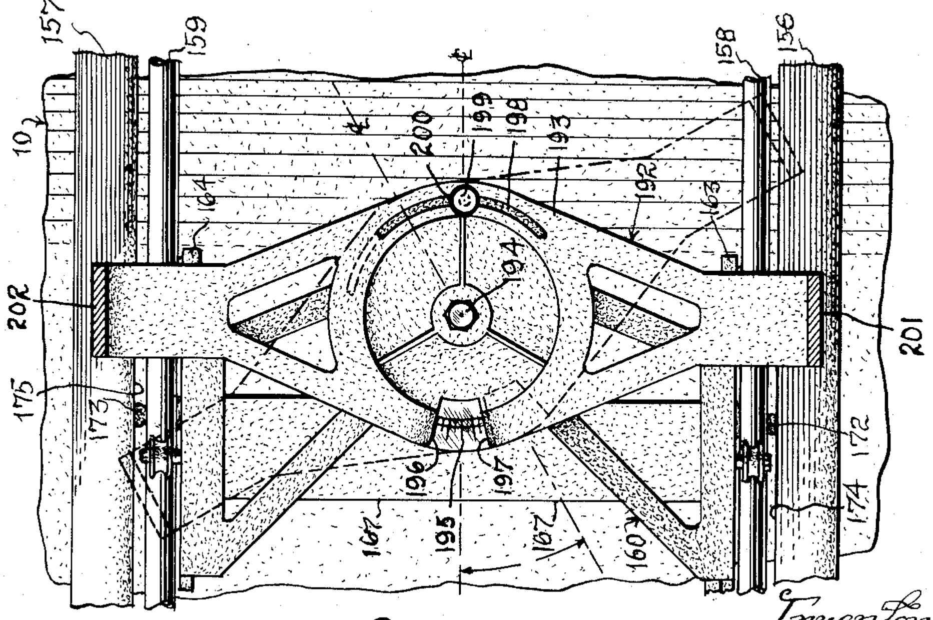
Figure 21:
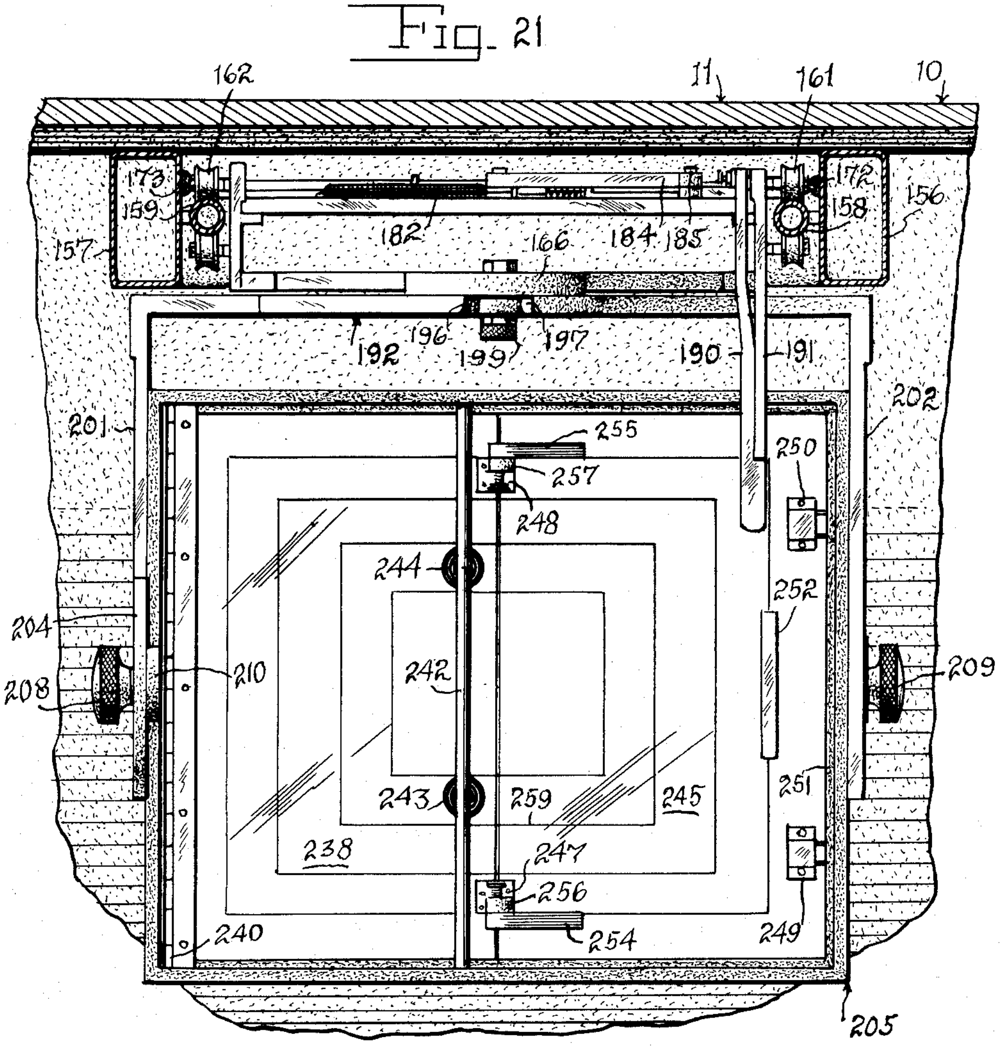
Figure 25:
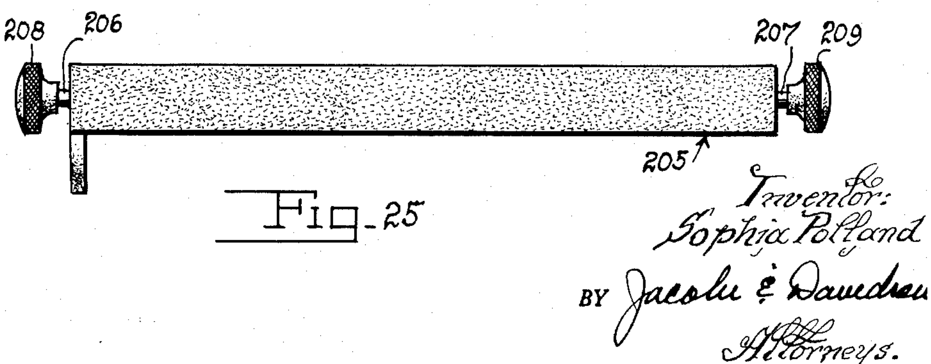
Figures 22, 23, 24:
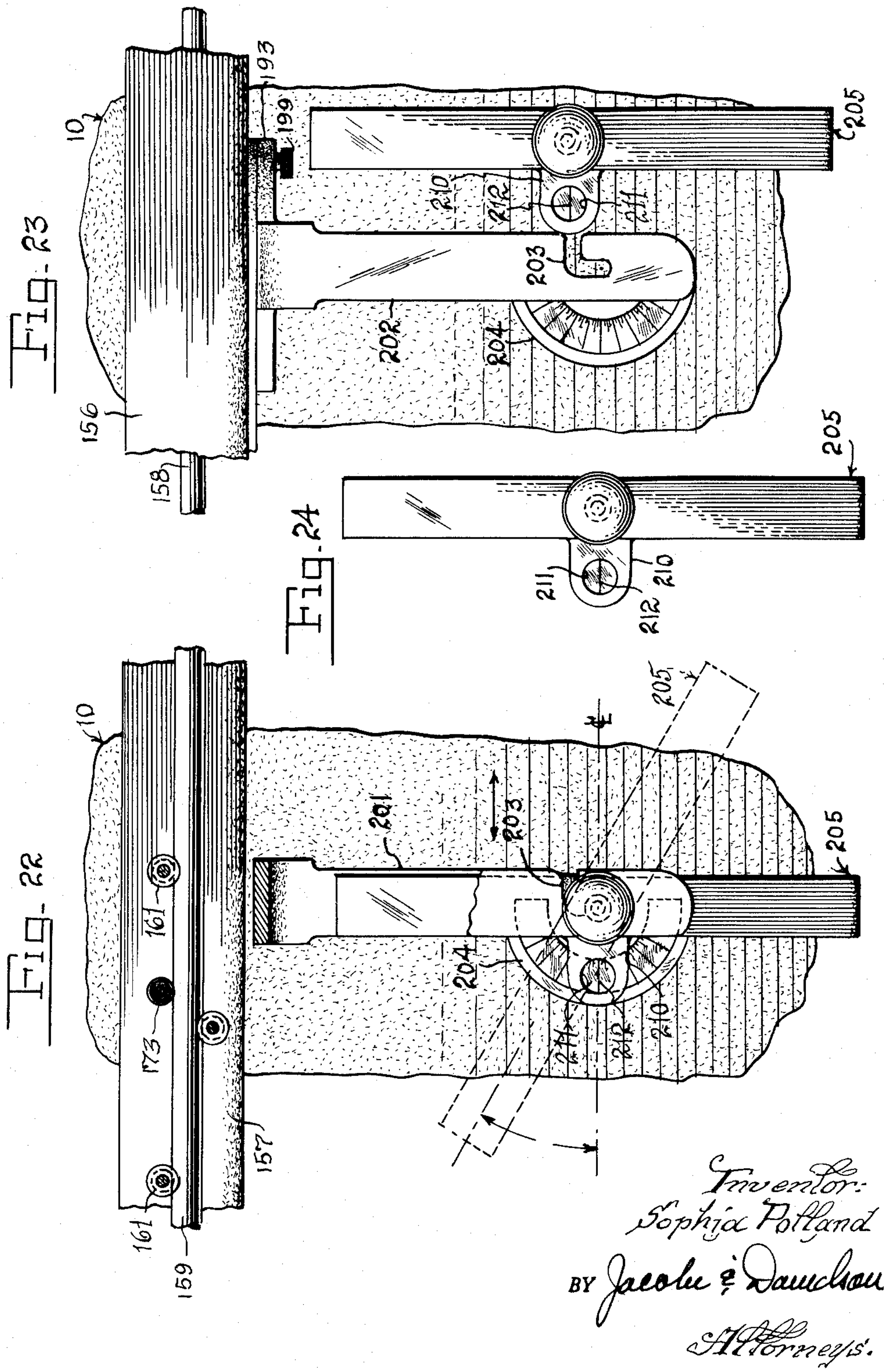
Figures 26, 29, 30:
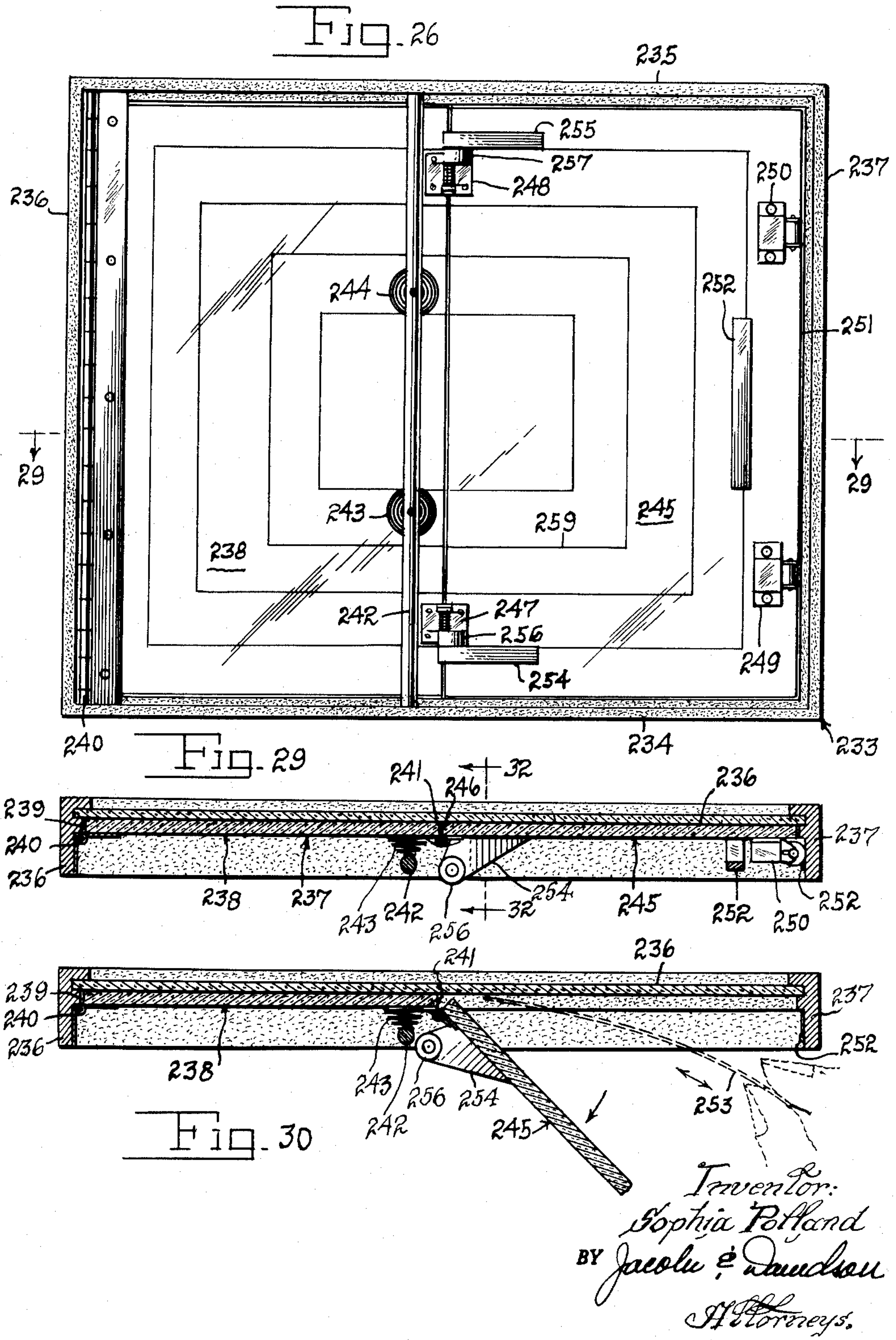
Figure 27:
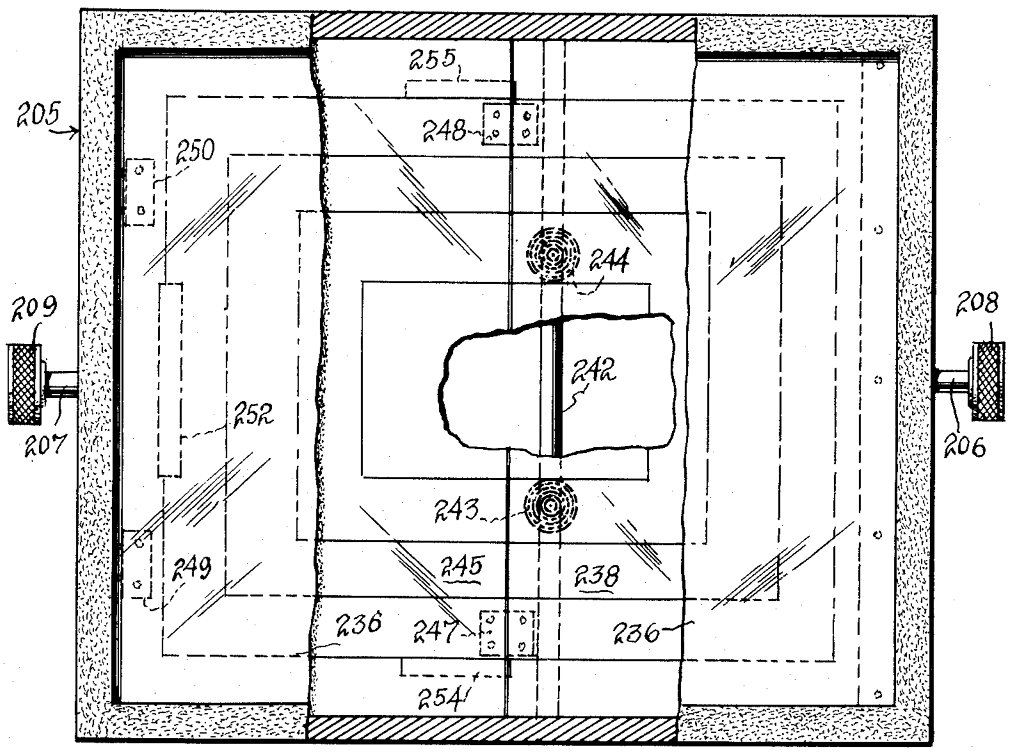
Figure 28:
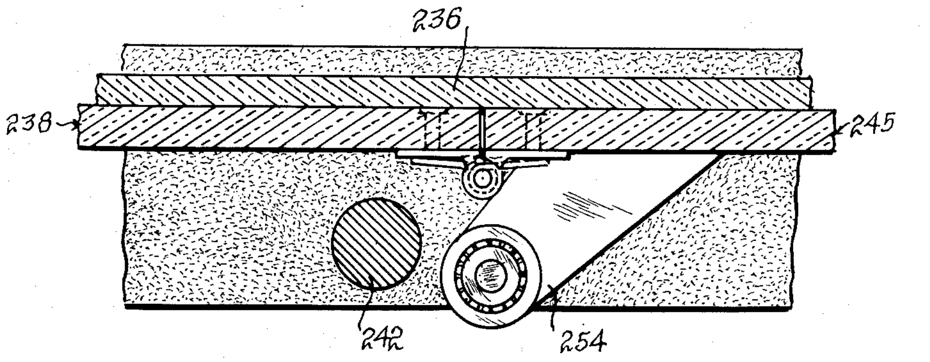
Figures 31, 32:
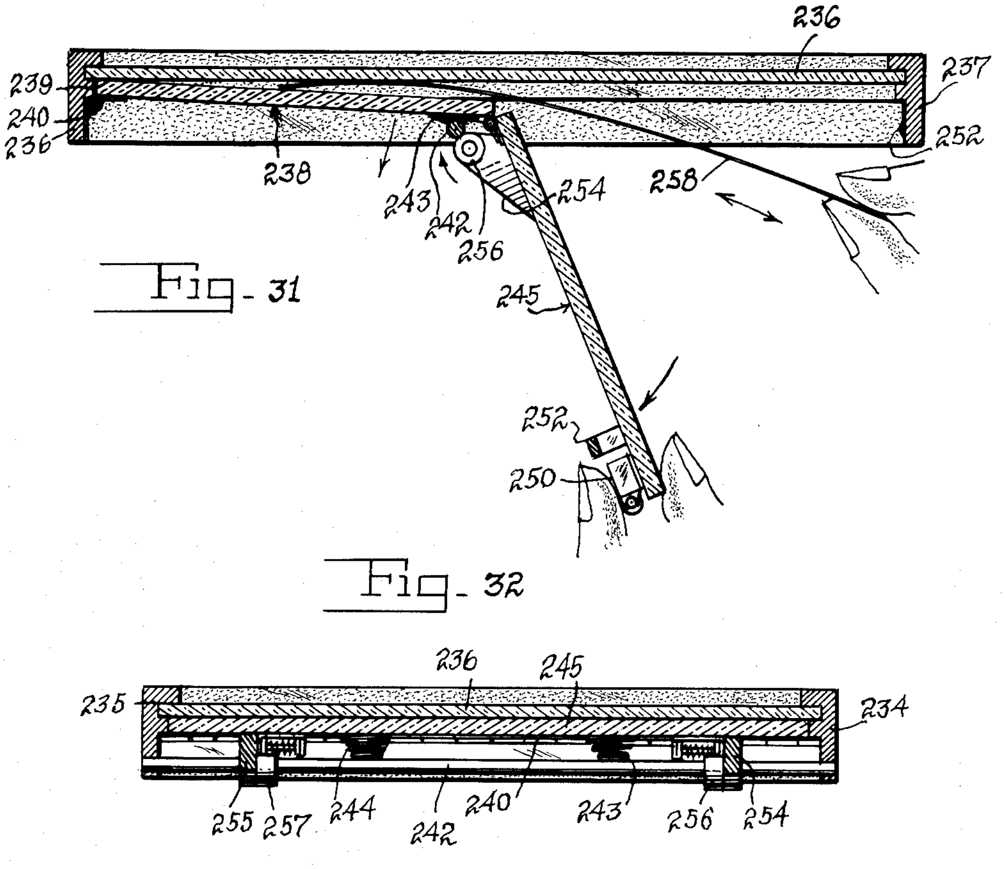
Figure 33:
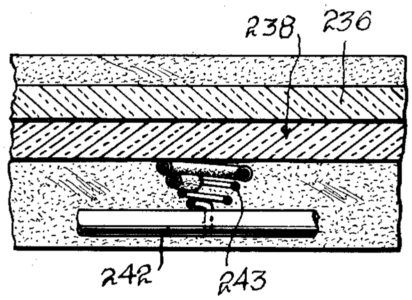
Figures 34, 35, 36:
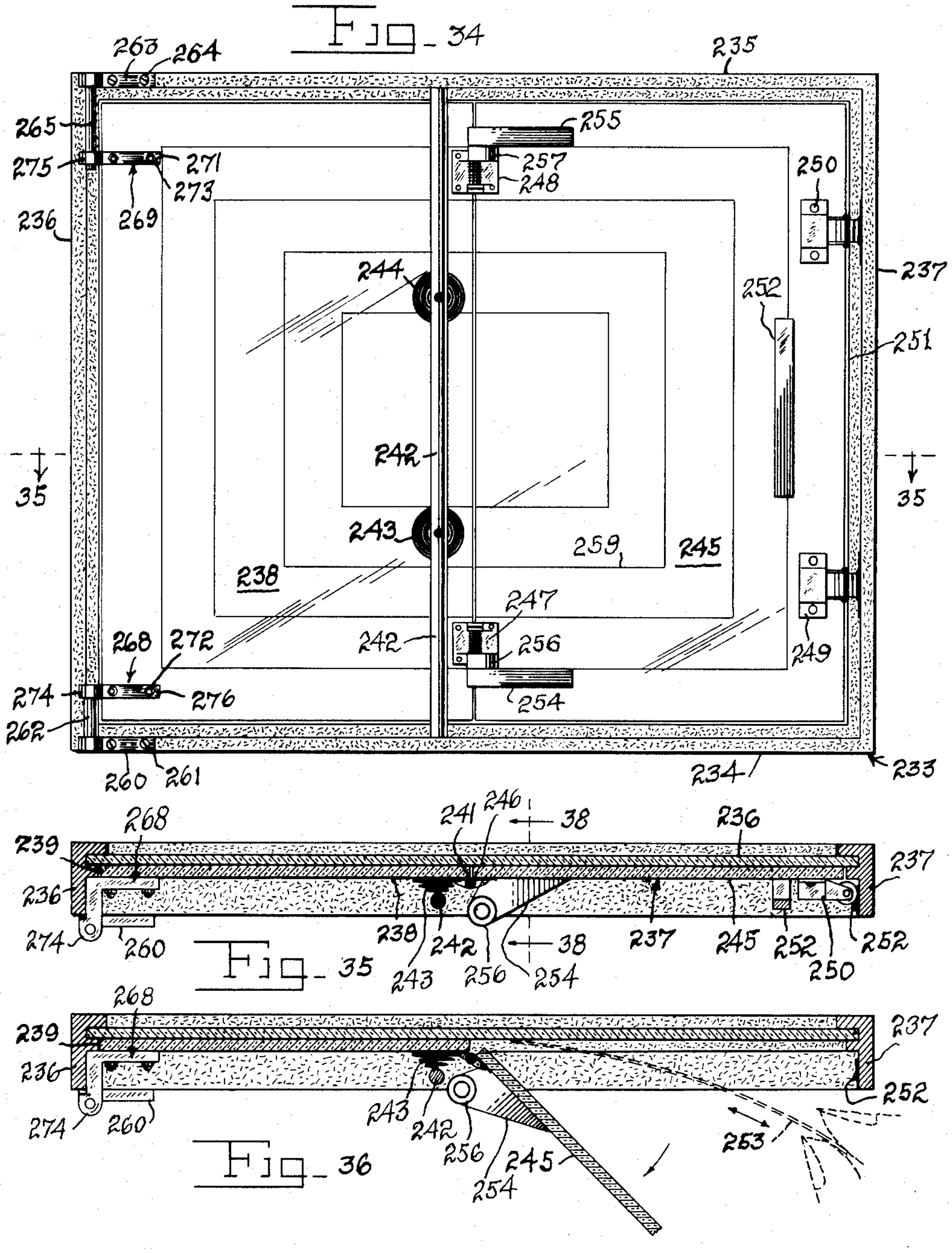
Figure 37:
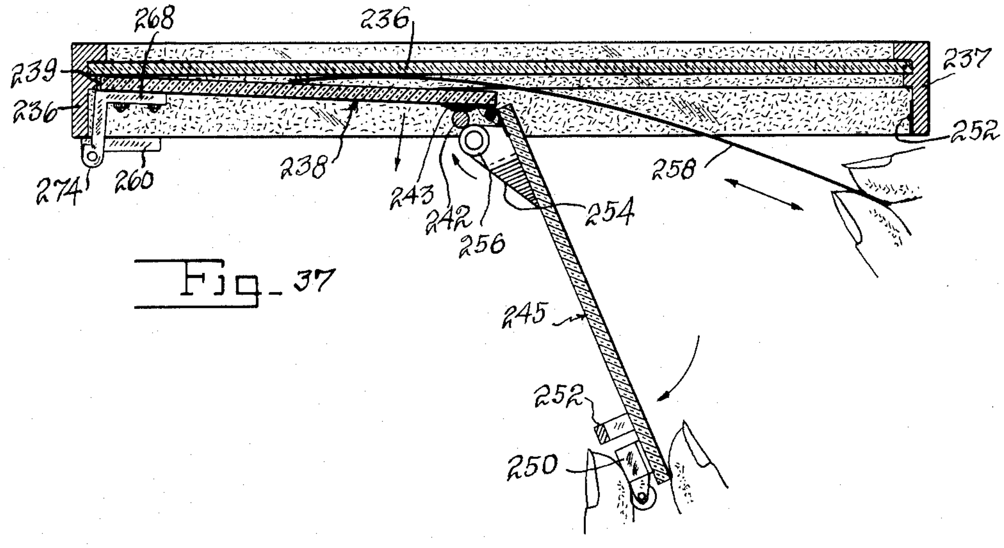
Figure 38:
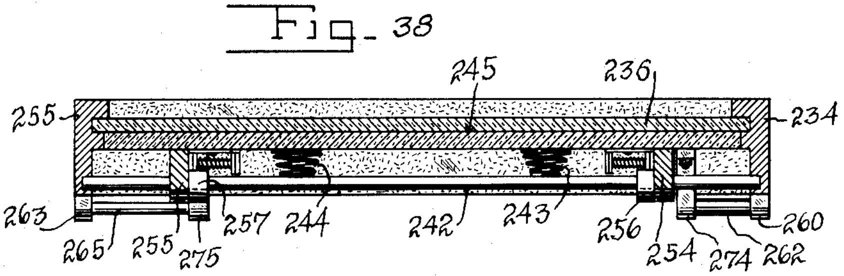
Figure 39:
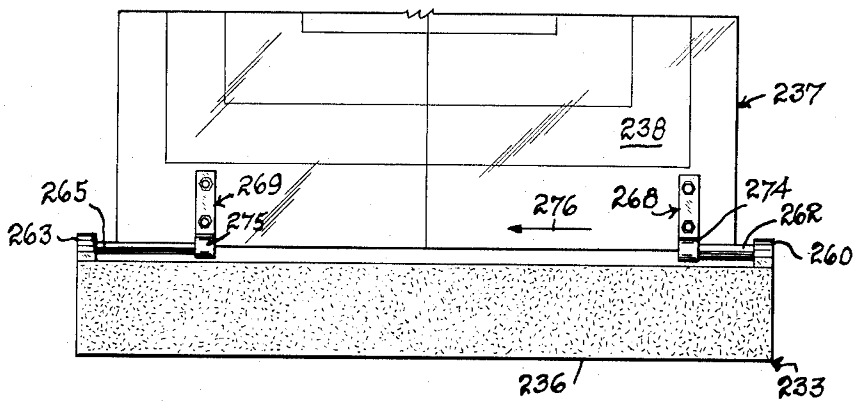
Figure 40:
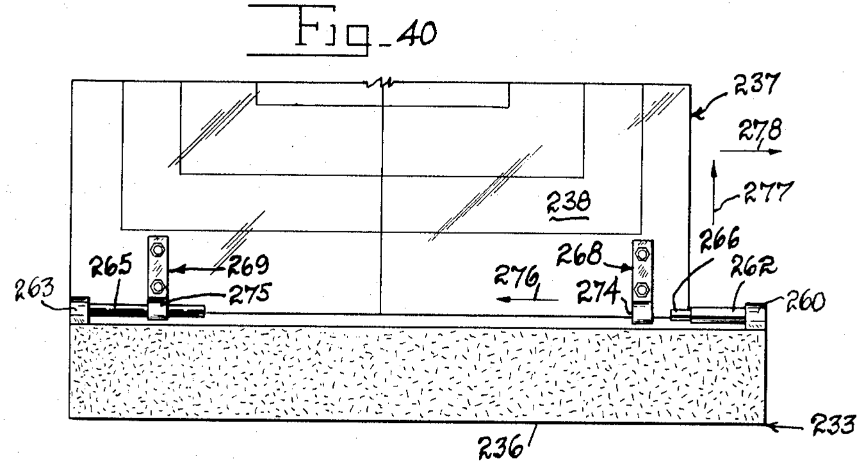
Figure 41:
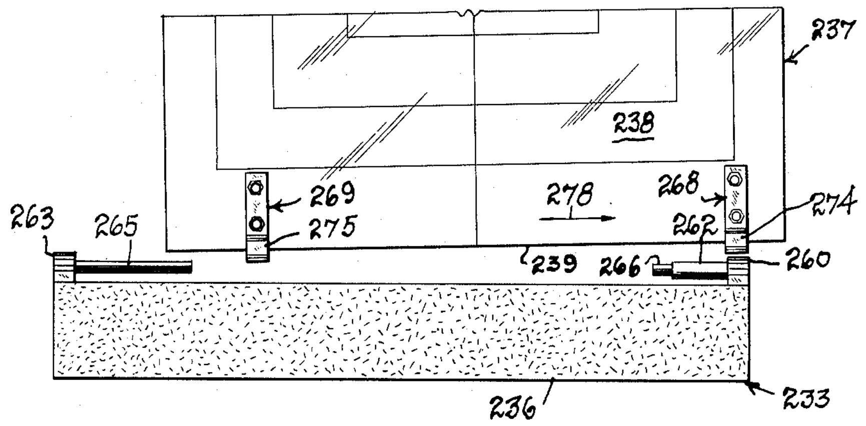
Figure 42:
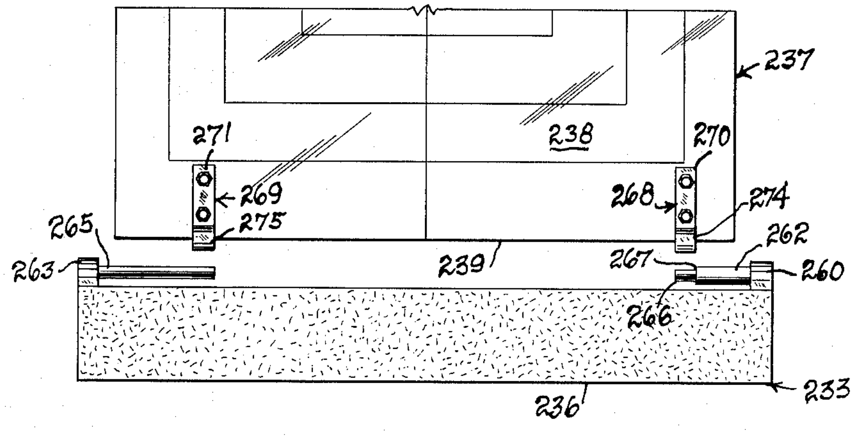

Further objects and advantages of the invention will be apparent from the following description taken in conjunction with the accompanying drawings, wherein:

FIG. 1 is a view in perspective, showing the entire apparatus in operating condition, and also showing the manner of operating the copy holder and light source supporting means to properly adjust the same;

FIG. 2 an elevational view with parts of the dark room wall broken away to show the interior arrangement, and also the manner of operating a portion of the apparatus disposed within the dark room;

FIG. 3 a view similar to FIG. 2, but showing various positions of the copy holder for providing different photographic effects, and also indicating the path traversed by the light rays reflected from material on the copy holder through the prism and lens system mounted on a wall of the dark room, and to a sheet of sensitized film or paper supported in the film holder within the dark room;

FIG. 4 a front elevational view of the apparatus showing the relationship between the copy holder and the light source supporting means which serves to provide proper illumination for material disposed on the copy holder;

FIG. 5 a horizontal sectional view showing the slidable mounting and locking means for the copy holder, and light source supporting means, as well as the light box and light source on the copy holder which serve to facilitate the positioning of material thereon;

FIG. 6 a horizontal sectional view showing the details of the slidable mounting as well as the locking means for the light source supporting carriage, and also showing the light source supporting frames and the slidable mounting thereof on the light source supporting carriage;

FIG. 7 a rear elevational view of the generally rectangular vertical frame as well as the rods carried thereby for slidably supporting the copy holder carriage and light source supporting carriage, together with the means for maintaining the light source carriage in horizontal position and the arrangement of counter weights or counterbalancing means for the two carriages;

FIG. 8 a fragmentary view in perspective showing the manner of adjusting the height and angularity of the copy holder in order to obtain the desired photographic effect;

FIG. 9 a fragmentary view in perspective, showing the manner of adjusting the light source supporting means with respect to the copy holder;

FIG. 10 a fragmentary elevational view, with parts in section for greater clarity, and showing the relationship between the copy holder and the light source supporting means;

FIG. 11 an elevational view showing the copy holder partially disassembled from the copy holder supporting carriage;

FIG. 12 a fragmentary elevational view showing the clamping means for holding the copy holder in adjusted angular position with respect to the copy holder carriage;

FIG. 13 a fragmentary elevational view showing details of the mechanism for releasably latching the copy holder carriage to the light source supporting carriage, and also a portion of the actuating means for the copying mechanism which serves to maintain the copy holder carriage in adjusted vertical position;

FIG. 14 a fragmentary elevational view showing further details of the locking means for locking the copy holder carriage in adjusted vertical position;

FIGS. 15 to 18 diagrammatic views showing various uses of the apparatus, and the relative position of the copy holder and film holder to provide different photographic effects;

FIG. 19 a bottom plan view showing the mounting for the film holder together with the location of the protractor for indicating the angular position of the film holder about a vertical axis, and also showing the means for locking such film holder in adjusted angular position about a vertical axis;

FIG. 20, a top plan view of the mounting means for the film holder, and showing the mechanism for locking the film holder in adjusted horizontal position;

FIG. 21, a rear elevational view of the film holder and mounting means, together with the depending handle for facilitating movement of the film holder in a horizontal direction as well as a portion of the mechanism for locking the film holder in adjusted horizontal position, and the actuating means therefor;

FIG. 22, a fragmentary side elevational view with parts in section for greater clarity, and showing the film holder in two angular positions with respect to the horizontal axis;

FIG. 23, a fragmentary side elevational view showing the film holder partially disassembled on the supporting frame;

FIG. 24, a side elevational view of the film holder, per se;

FIG. 25, a side elevational view of the film holder shown in FIG. 24, but taken at right angles thereto;

FIG. 26, a plan view of the rear side of the film holder showing the means for holding a sheet of film or sensitized paper in place therein;

FIG. 27, a plan view with parts broken away and in section for greater clarity, of the front side of the film holder shown in FIG. 26;

FIG. 28, a fragmentary sectional view to an enlarged scale, showing the hinging arrangement for the two-part film pressure plate, as well as the cam means for raising one portion of the pressure plate;

FIG. 29, a sectional view taken substantially on the line 29—29 of FIG. 26, and showing the film holding pressure plate in closed film-holding position;

FIG. 30, a view similar to FIG. 29, but showing one portion of a film-holding pressure plate open to permit insertion or removal of a sheet of film;

FIG. 31, a view similar to FIG. 30, but showing the entire film-holding pressure plate open to permit insertion or removal of a large sheet of film;

FIG. 32, a sectional view taken substantially on the line 32—32 of FIG. 29, and showing the relationship of the spring hinges and compression spring means for urging the film-holding pressure plate toward the film-supporting transparent plate;

FIG. 33, a fragmentary sectional view showing the compression spring arrangement for holding one portion of the film holding pressure plate in engagement with a sheet of film;

FIG. 34, a plan view of the rear side of a modified form of film holder, showing the hinge means for mounting the film holding two-part pressure plate on the frame of the film holder;

FIG. 35, a sectional view taken substantially on the line 35—35 of FIG. 34, and showing the position of the modified hinge means with the two-part pressure plate in film-holding position;

FIG. 36, a view similar to FIG. 35, but showing one portion of the two-part pressure plate open to permit insertion or removal of a sheet of film;

FIG. 37, a view similar to FIG. 36, but showing the entire film-holding pressure plate open to permit insertion or removal of a larger sheet of film;

FIG. 38, a sectional view taken substantially on the line 38—38 of FIG. 35;

FIG. 39, a fragmentary elevational view showing the pressure plate opened outwardly of the film-holder frame, and prior to movement of the pressure plate to remove the same from the frame;

FIG. 40, a view similar to FIG. 39, but showing the first step in removing the pressure plate from the film-holding frame;

FIG. 41, a view similar to FIG. 40, and showing the second step in removal of the pressure plate from the film-holding frame; and, FIG. 42, a view similar to FIG. 41, and showing the pressure plate completely removed from the film-holding frame.

With continued reference to the drawings, and particularly FIGS. 1 to 4, there is shown a process camera constructed in accordance with this invention, and which may well include a light-tight enclosure 10 having a top wall 11, a bottom wall 12, side walls 13 and 14, and end walls 15 and 16. An access door 17 may be provided in the side wall 13, and if desired suitable ventilating means 18 may be mounted in the door 17. Also, if desired, suitable accessory equipment such as a foldable table, print dryer, or the like 19 may be secured exteriorly to the wall 13 of the enclosure 10. The enclosure 10 serves to provide a dark room to accommodate certain portions of the equipment, as well as an operator, and disposed within the dark room may be a suitable sink 20 and safe light 21, as well as any other items of photographic equipment necessary for use within the dark room in exposing and processing of film or sensitized paper during the operation of the apparatus.

With particular reference to FIGS. 1 to 7, a generally rectangular frame 22, which may if desired be formed of tubular side members 23 and 24, is secured to the end wall 16 in vertical position, and as best shown in FIGS. 4 to 7, spaced vertically disposed rods 25 and 26 are mounted within the frame 22. Mounted on the outer surface of the frame 22 for a purpose to be later described, are spaced, parallel, vertically disposed angle bars 27 and 28.

A copy holder carriage 29 is provided with a cross-bar 30 disposed forwardly of the frame 22, and extending rearwardly from the cross-bar 30 are spaced, substantially parallel ears 31 and 32, such ears serving to mount rollers 33 and 34, respectively, which in turn engage the vertical rods 25 and 26, and serve to mount the copy holder carriage 29 thereon for vertical sliding movement.

Since it is essential that carriage 29 be maintained in a horizontal position, both for the purpose of photographic reproduction and also for the purpose of preventing binding between the mounting rollers 33 and 34 and the rods 25 and 26, in order to facilitate vertical movement of the carriage 29, with particular reference to FIG. 7, there is shown a means for maintaining the copy holder carriage 29 in horizontal position at all times, regardless of the vertical position thereof. For this purpose, an upper pair of pulleys 35 and 36 may be mounted on the frame 22, and a lower pair of pulleys 37 and 38 may also be mounted on the frame 22. A flexible member 39, which to all intents and purposes, constitutes an endless, flexible member, is trained over the pulleys 35, 36, 37, 38, as shown in FIG. 7, with one vertical run 40 adjacent the rod 25, and secured at 41 to the ear 31 on the copy holder carriage 29, and another vertical run 42 is disposed adjacent the rod 26, and is secured at 43 to the ear 32 on the copy holder carriage 29. Between the pulleys 35 and 37, and 36 and 38, the flexible member 39 crosses with one portion 44 leading from the pulley 36 to the pulley 37, and the other portion 45 leading from the pulley 35 to the pulley 38. It will consequently be seen that this arrangement permits free vertical movement of the copy holder carriage 29, but at the same time, by reason of the attachment of the vertical runs 40 and 42 to the ears 31 and 32, the copy holder carriage 29 is maintained in horizontal position at all times.

With particular reference to FIGS. 5, 13 and 14, the copy holder carriage 29 is provided with means for releasably locking such carriage in vertically adjusted position, and this locking means may well comprise oppositely movable lock bolts 46 and 47 slidably mounted in brackets 48 and 49, respectively, secured to the cross-bar 30 of the copy holder carriage 29, and the lock bolt 46 is provided with friction means 50 for engaging one flange 51 of the angle bar 28, while the other lock bolt 47 is provided with friction means 52 for engaging one flange 53 of the angle bar 27. A generally triangular-shaped rock plate 54 is pivotally mounted at 55 on the cross member 30 of the copy holder carriage 29, and a link 56 connects the inner end of lock bolt 46 to the rock plate 54, while a link 57 connects the inner end of lock bolt 47 to the rock plate 54, which serves to provide a toggle actuating means between the rock plate 54 and lock bolts 46 and 47. An actuating rod 58 is slidably mounted on the cross member 30 of the copy holder carriage 29, and a portion 59 of the actuating rod 58 projects from the copy holder carriage 29 at one side thereof, and is provided with a hand-engaging knob 60 on the outer end thereof. A link 61 is pivotally connected at 62 to the actuating rod 58, and the opposite end of the link 61 is pivotally connected at 63 to the rock plate 54. Consequently, by inward or outward movement of the actuating rod 58, the rock plate 54 is pivoted about the pivot point 55, which results in projecting the friction means 50 and 52 into engagement with the flanges 51 and 53 of the angle bars 28 and 27, respectively, or will serve to disengage the friction means 50 and 52, therefrom.

As best shown in FIG. 13, spaced downwardly projecting latch fingers 64 and 65 are pivotally mounted at 66 and 67 on the cross member 30 of the copy holder carriage 29, and the fingers 64 and 65 are provided with beveled lower ends 68 and 69, as well as inwardly facing notches 70 and 71, the purpose of which will be later described. A link 72 is pivotally connected at one end 73 to the end of the latch finger 65 above the pivot 67, and the opposite end of the link 72 is pivotally connected at 74 to the latch finger 64, below the pivot 66. A return spring 75 is connected at one end 76 to the cross member 30 of the copy holder carriage 29, and the opposite end 77 of the spring 75 is connected to the latch finger 65 above the pivot 67. An abutment 78 is adjustably mounted on the actuating rod 58, and the abutment 78 engages the latch finger 64 above the pivot point 66.

It will thus be seen that inward movement of the actuating rod 58 by depressing the hand-engaging knob 60 results in pivotal movement of the rock plate 54, which through the links 56 and 57 disengage the friction means 50 and 52 from the angle bars 28 and 27, thereby permitting free vertical movement of the copy holder carriage 29, and at the same time further inward movement of the actuating rod 58 will, through the engagement of abutment 78 with the latch finger 64 result in moving both latch fingers 64 and 65 outwardly against the action of return spring 75. Upon release of the hand-engaging knob 60, the return spring 75 will operate to move the latch fingers 64 and 65 inwardly to the position shown in FIG. 13, and engagement of the latch finger 64 with the abutment 78 will operate to move the actuating rod 58 outwardly, and through the link 61 and rock plate 54 will move the friction means 50 and 52 into locking engagement with the angle bars 28 and 27 to lock the copy holder carriage 29 in vertically adjusted position. The purpose of the latch fingers 64 and 65 will be later described. It is to be noted that the handle mechanism above described is so proportioned, and the abutment 78 is so adjustably positioned on the actuating rod 58 that initial movement of the actuating rod 58 results in disengaging the friction means 50 and 52 from the angle bars 28 and 27, and that it is only upon further movement of the actuating bar 68 that the latch finger 64 and 65 are moved outwardly about their pivot points 66 and 67.

Extending forwardly from the cross member 30 of the copy holder carriage 29 are spaced, parallel arms 79 and 80, and adjacent the forward ends but spaced therefrom are upwardly opening, semi-circular recesses 81 and 82. Recesses 81 and 82 serve to removably and rotatably receive semi-circular trunnions 83 and 84 projecting outwardly from the generally rectangular frame of a copy holder 85. The copy holder 85 is provided with a transparent or translucent plate of glass, plastic or any other suitable material 86 which serves to support material to be photographed. The supporting plate 86 may be provided with a central opening 87, and below the opening 87 there is provided a box 88 which serves to receive a tubular serpentine light source 89 which may be utilized for projecting light rays through the material disposed on the supporting surface 86 in order to facilitate proper positioning of such material and also to facilitate adjustment and focusing of the camera apparatus. While a tubular serpentine light source 89 is shown as disposed in the box 88, obviously other forms of light source may be provided. The tubular serpentine light source is shown primarily for illustrative purposes only. Mounted on opposite sides of the copy holder frame 85 adjacent the trunnions 83 and 84 are downwardly extending semi-circular plates 90 and 91, and at least one of these plates is provided with a protractor 92. As best shown in FIGS. 10 and 11, the protractor 92 is disposed opposite an aperture 93 in the forwardly extending arm 79 of the copy holder carriage 29, and the aperture 93 serves to receive a disk of transparent material having an index line 94 applied thereto. Consequently, the protractor 92, as observed through the aperture 93 and in conjunction with the index line 94 serves to indicate the angular position of the copy holder frame 85 about a horizontal axis parallel to the frame 22. As shown in FIG. 10, the copy holder frame 85 may be moved in either direction about the axis provided by the trunnions 81 and 82, in order to position the material supported thereby in any desired location.

In order to securely and releasably lock the copy holder frame 85 is adjusted angular position, there may be provided screw threaded clamping screws 95 rotatably received in apertures in the arms 79 and 80, and provided with finger engaging knobs 96, and the screws 95 threadedly engage clamping plates 97, which, as clearly shown in FIG. 12, overlap and engage the semi-circular plates 90 and 91 on the copy holder frame 85, and the clamping plates 97 may be tightly clamped against the semi-circular plates 90 and 91 to securely hold the copy holder frame 85 in adjusted angular position, or released therefrom to permit convenient angular adjustment of the copy holder frame 85.

It will thus be seen that by the above-described portion of the invention there has been provided a copy holder which serves to support material to be photographed, and such copy holder is mounted in such a manner as to facilitate vertical movement thereof to any desired vertical position, and also may be adjusted angularly about a horizontal axis to position the material in any desired angular location. Means has been provided to maintain the copy holder in a horizontal position, and furthermore, conveniently useable locking means has been provided to releasably lock the copy holder in adjusted vertical position, and other locking means is provided for securing the copy holder in adjusted angular position, and to clearly and conveniently indicate such angular position.

Since it is necessary to provide suitable illumination for material supported on the copy holder to be photographed, there has been provided for this purpose a light source carriage 98 which is generally rectangular in form, and is provided with rearwardly extending ears 99 and 100, which in turn are provided with rollers 101 and 102, respectively, which engage the rods 25 and 26 on the frame 22 to support the light source carriage for vertical movement thereon. It is to be noted that the light source carriage 98 is disposed below the copy holder carriage 29, and in order to releasably lock the light source carriage 98 in adjusted position, there may be provided thereon spaced slidably mounted locking rods 103 and 104, and such rods may be provided at their inner ends with suitable friction means 105 and 106 for engaging the flanges 107 and 108 of the angle bars 27 and 28. The friction means 105 and 106 are urged into engagement with the flange 107 and 108 by compression spring means 109 and 110 received on the locking rods 103 and 104, as clearly shown in FIG. 6.

Levers 111 and 112 are pivotally mounted at 113 and 114 on the forward portion of the light source carriage 98, and the outer ends 115 and 116 of the levers 111 and 112 serve to engage abutments 117 and 118 on the locking rods 103 and 104, respectively, and the inner ends 119 and 120 of the levers 111 and 112 overlap and are engaged by a forwardly projecting actuating rod 121, which is provided at the forward end thereof with a hand-engaging knob 122, and as clearly shown in FIG. 6, the impression of the knob 122 will result in moving the locking rods 103 and 104 outwardly against the action of compression springs 109 and 110 to disengage the friction means 105 and 106 from the flanges 107 and 108 of the angle bars 27 and 28 to permit free vertical movement of the light source carriage 98. Release of the knob 122 will permit the friction means 105 and 106 to engage the flanges 107 and 108 under the action of compression springs 109 and 110, to lock the light source carriage 98 in adjusted vertical position.

Transversely disposed trackways 123 and 124 on the light source carriage 98 serve to receive light source supporting frames 125 and 126 disposed on opposite sides of the light source carriage 98, and as clearly shown in FIG. 6, the light source supporting frames 125 and 126 generally are U-shaped with the legs 127 and 128 of the frame 125 slidably engaging the trackways 123 and 124, respectively, and with the legs 129 and 130 of the frame 126 also slidably engaging the trackways 123 and 124, respectfully. Consequently, the frames 125 and 126 may be moved outwardly or inwardly with respect to the light source carriage 98 to any desired position. A bracket 131 extends upwardly from the frame 125, and at the upper end of the bracket 131 there is pivotally mounted a light source reflector 132, which serves to receive a tubular or other suitable light source. The reflector 132 may be provided with suitable clamping means 133 at the pivotal mounting 134, in order to provide for clamping of the reflector 132 in adjusted position. In a similar manner, a bracket 135 projects upwardly from the frame 126, and pivotally mounted on the upper end of the bracket 135 is a light source reflector 136 which also serves to receive a tubular or other suitable light source and a clamping means 137 at the pivotal mounting 138 of the reflector 136 serves to provide means for locking the reflector 136 in adjusted position. It will accordingly be seen that the frames 125 and 126 with the light source reflectors 132 and 136 pivotally mounted thereon serve to provide an adjustable source of illumination for material supported on the copy holder frame 85, and the light source may be adjusted in order to provide the desired illumination.

For certain types of photographic work, it is desirable to maintain relationship between the light source reflectors 132 and 136 and the copy holder frame 85 fixed, regardless of the vertical position of the copy holder frame, and for this purpose there is provided spaced pins 139 and 140 on the light source carriage 98, and such pins serve to engage the notches 70 and 71 in the latch fingers 64 and 65 on the copy holder carriage 29, and accordingly when the pins 139 and 140 are engaged in the notches 70 and 71, the copy holder carriage 29 and the light source carriage 98 are locked together for simultaneous vertical movement. In the event it is desired to vertically adjust the copy holder carriage 29 and the light source carriage 98 with respect to each other, the notches 70 and 71 in the latch fingers 64 and 65 are disengaged from the pins 139 and 140 by actuation of the rod 58 on the copy holder carriage 29, as a result of which the carriages may be moved vertically independently of one another. When such relative vertical movement is completed, and the carriages 29 and 98 are properly spaced apart, interlocking of such carriages can be accomplished automatically by reason of the engagement of the pins 139 and 140 with the beveled lower ends 68 and 69 of the latch fingers 64 and 65, which serves to cam such latch fingers outwardly against the action of tension spring 75, whereupon the pins 139 and 140 will again engage in the notches 70 and 71 to latch the carriages 29 and 98 together for simultaneous vertical movement.

Since the copy holder assembly and light source assembly are of appreciable weight, even though the same may be manufactured of light weight materials, it is consequently desirable to reduce insofar as possible, the manual labor required to vertically adjust these assemblies, and for this purpose there may be provided counterbalancing means in the form of a counterweight 141 for the copy holder carriage 29 and associated structure and a counterweight 142 for the light source carriage 98 and associated structure. As best shown in FIGS. 6 and 7, the counterweights 141 and 142 are disposed within the frame 22, and the counterweight 141 is connected by flexible elements 143 and 144 which extend upwardly and are trained over pulleys 145 and 146, and downwardly to lugs 147 and 148 provided on the ears 31 and 32 of the copy holder carriage 29. In a similar manner, flexible elements 149 and 150 extend upwardly from the counterweight 142, and over pulleys 151 and 152 from which the same extend downwardly and are attached to lugs 153 and 154 on the light source carriage 98, it being noted that the lugs 153 and 154 are provided on the ears 99 and 100 of the light source carriage 98. In this manner, simultaneous or independent vertical movement of the copy holder assembly and light source assembly is permitted, and is substantially counterbalanced in order to reduce the manual effort necessary for this operation. In order to conceal the counterweights 141 and 142, as well as the associated flexible elements, and also the other structure disposed within the frame 22, the forward side of the frame 22 may be closed by a suitable panel 155.

*Film holder and mount*

With particular reference to FIGS. 2, 3 and 20 to 25, there is shown a film holder and mount installed in the enclosure 10, and such film holder and mount is particularly adapted for use in the process camera of this invention in connection with the particular copy holder described above, but the film holder and mount may also be utilized in connection with other types of copy holders, or in different types of process cameras. As shown in the above-mentioned figures of the drawing, the top wall 11 of the enclosure 10 may be provided with spaced horizontal tubular supports 156 and 157 which may be secured to the top wall 11 in any desired manner, and extend between the end walls 15 and 16 of the enclosure 10. Mounted on the tubular supports 156 and 157 and disposed therebetween are spaced parallel, horizontal rails 158 and 159, and a film holder carriage 160 is provided with rollers 161 on one side thereof which engage the rail 158, and with similar rollers 162 on the opposite side, which engage the rail 159. The rollers 161 and 162 serve to mount the film holder carriage 160 for horizontal movement along the rails 158 and 159 between the end walls 15 and 16 of the enclosure 10. The film holder carriage 160 may well comprise side members 163 and 164 which serve to provide a mount for the rollers 161 and 162, respectively, and the side members 163 and 164 may be connected by a web 165 having a central, substantially circular portion 166, the purpose of which will be presently described. Also mounted between the side members 163 and 164 is a cross member 167 on the upper surface of which are mounted brackets 168 and 169, which serve to slidably support lock bolts 170 and 171. The outer ends of the lock bolts 170 and 171 are provided, respectively, with friction means 172 and 173 for engaging the inner surfaces 174 and 175 of the tubular support members 156 and 157. With the friction means 172 and 173, in engagement with the surfaces 174 and 175, the film holder carriage 160 is locked in adjusted horizontal position, and the mechanism for actuating the friction means 172 and 173 mounted on the lock bolts 170 and 171 will now be described.

Provided on the inner ends of the lock bolts 170 and 171 are cam followers 176 and 177, and disposed around the lock bolts 170 and 171 and between the inner ends of the brackets 168 and 169 and the cam followers 176 and 177 are compression springs 178 and 179, which operate to urge the lock bolts 170 and 171 with the friction means 172 and 173 thereon inwardly, and out of engagement with the surfaces 174 and 175 on the supports 156 and 157. Rotatably mounted on the cross member 167 of the film holder carriage 160 and between the cam followers 176 and 177 is a cam 180 having diametrically opposed lobes as shown in FIG. 20, which serve to engage the cam followers 176 and 177, to urge the locking bolts 170 and 171 and the friction means 172 and 173 thereon outwardly into engagement with the surfaces 174 and 175 on the supports 156 and 157. The cam 180 is provided with an arm 181 thereon, to which is connected one end of a tension spring 182, the opposite end 183 of the spring 182 being connected to the cross member 167 of the film holder carriage 160 and the tension spring 182 serves to rotate the cam 180 in such a manner as to bring the lobes thereon into engagement with the cam followers 176 and 177, to urge the lock bolts 170 and 171 and friction means 172 and 173 thereon outwardly against the action of the compression springs 178 and 179.

Pivotally connected at one end to the arm 181 of the cam 180 is a link 184, the opposite end of which is pivotally connected at 185 to a bellcrank lever 186, the opposite end of such bellcrank lever being connected at 187 to one end of a link 188. The opposite end of the link 188 is pivotally connected at 189 to a cam-actuating lever 190, which is pivotally mounted on a handle 191 depending from the film holder carriage 160 to a position convenient to the operator standing in the enclosure 10. Obviously, operation of the lever 190 will cause operation of the cam 180 to move the lobes thereon away from the cam followers 176 and 177, thereby permitting the compression springs 178 and 179 to move the lock bolts 170 and 171, and the friction means 172 and 173 carried thereby inwardly out of engagement with the surfaces 174 and 175 on the supports 156 and 157 to permit free horizontal movement of the film holder carriage 160, and upon reaching the desired horizontal position, release of the lever 190 will permit movement of the cam 180 by the tension spring 182 to move the lobes into engagement with the cam followers 176 and 177, and move the friction means 172 and 173 into engagement with the surfaces 174 and 175 to lock the film holder carriage 160 in adjusted horizontal position. The depending handle 191 facilitates movement of the film holder carriage 160 horizontally on the rails 158 and 159, and since the cam operating lever 190 is pivotally mounted on the handle 191, convenient one hand operation of the film holder carriage 160 is provided for.

A generally U-shaped camera holder bracket 192 comprises a generally circular central portion 193 of substantially the same size as the circular central portion 166 of the film holder carriage 160, and the central portion 193 of the film holder bracket 192 is rotatably mounted on the lower side of the circular central portion 166 of the film holder carriage 160 by screw threaded or other suitable means 194 which may extend through the film holder bracket 192 and film holder carriage 160. A suitable protractor 195 may be provided on the lower surface of the circular portion 166 of the film holder carriage 160, and a notch 196 in the circular central portion 193 of the film holder bracket 192 is provided with a beveled edge 197, which is disposed opposite the protractor 195, and provides an index for conveniently indicating the angular position of the film holder bracket 192 about a vertical axis with respect to the film holder carriage 160. In order to lock the film holder bracket 192 in adjusted angular position about a vertical axis, there may be provided in the circular central portion 193 of the film holder bracket 192 an arcuate slot 198, which serves to receive a threaded stud 199 fixed to the circular portion 166 on the film holder carriage 160, and threadedly received on the stud 199 is a finger-engaging clamping knob 200, which serves to clampingly engage the circular portion 193 of the film holder bracket 192 to lock the same in angular position about a vertical axis. Depending from the film holder bracket 192 and forming a part thereof are spaced parallel arms 201 and 202, and such arms are provided adjacent their lower ends with L-shaped slots 203, the purpose of which will presently appear. Mounted adjacent the lower end of arm 201 and in alignment with the slot 203 therein is a protractor 204, which is utilized for a purpose to be presently described.

A film holder 205 comprising a generally rectangular frame is provided on opposite sides thereof with threaded supporting studs 206 and 207, and such studs are provided with finger engaging knobs 208 and 209. Studs 206 and 207 are received in the L-shaped slots 203 in the lower ends of the arms 201 and 202, as clearly shown in FIGS. 21 and 22, and the studs serve to support the film holder 205 for rotation about a horizontal axis. Provided on the film holder 205 adjacent the protractor 204 on the arm 201 is an ear 210 having an aperture 211 therein, and disposed in the aperture 211 is a disk of transparent material on which is provided an index line 212, which, as clearly shown in FIG. 22, is disposed opposite the protractor 204, and provides a convenient index for reading or indicating the angular position of the film holder 205 about a horizontal axis with respect to the film holder bracket 192. The threaded studs 206 and 207, in addition to rotatably supporting the film holder 205 on the bracket 192, also serve to clamp the film holder 205 in adjusted angular position about a horizontal axis.

Consequently, it will be seen that by the above described structure, the film holder carriage 160 may be positioned at any desired horizontal location between the end walls 15 and 16 of the enclosure 10, and the film holder 205 may be positioned at any desired angular location about a vertical axis, as well as at any desired angular location about a horizontal axis. This serves to provide universal movement of the film holder 205, and is one of the important features contributing to the versatility of the apparatus of this invention.

In order to provide for the proper transmission of light rays reflected from material disposed on the copy holder to a sensitized sheet of film or paper carried by the film holder within the enclosure 10, there is shown somewhat diagrammatically in FIG. 3 an optical system for accomplishing this purpose, and since the details of such optical system form no part of the instant invention, this system is merely shown diagrammatically, and described in order to provide a complete operative device. As shown in FIG. 3, a hood 213 may be mounted on the front end wall 16 of the enclosure 10, and the interior of the hood 213 communicates with the interior of the enclosure 10. Mounted on the hood 213 is a suitable prism 214 for reflecting vertical light rays horizontally into the interior of the enclosure 10, in conjunction with the prism 214 there may be provided a suitable lens system 215, and if desired or necessary, a suitable shutter which is not shown in the drawing. As a consequence of this system, light rays reflected upwardly from material disposed on the copy holder are reflected by the prism 214 through the lens system 215, and along a horizontal axis, as indicated by the arrow 216, to a sheet of sensitized film or paper carried by the film holder 205 within the enclosure 10. In this manner, the sensitized film or paper is exposed to provide the desired photographic reproduction of the material disposed on the copy holder. As shown in FIGS. 1, 2 and 3, a protective housing 217 may be provided for covering the upper portion of the prism 214, in order to prevent damage thereto.

As was stated above, the number of different photographic effects which may be obtained with the apparatus of this invention merely by adjusting the relative positions of the copy holder 85 and film holder 205 are substantially infinite, and consequently in order to provide an understanding of the operation of this apparatus, it is only considered necessary to illustrate and describe a few of the possible effects which may be obtained, and FIGS. 15 to 18 illustrate diagrammatically several different possibilities.

Figure 15:
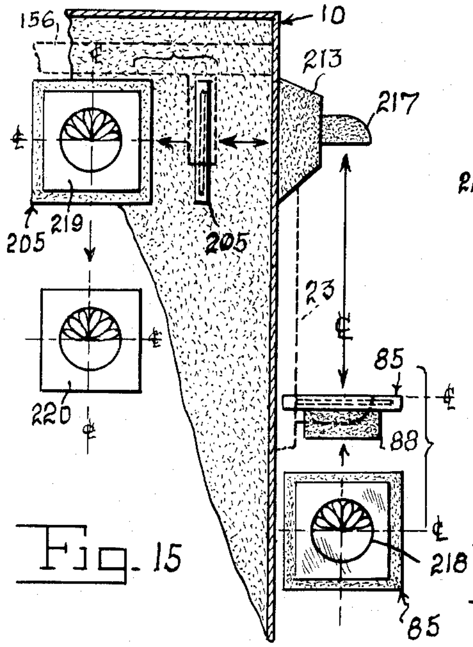

FIG. 15 illustrates the use of the process camera of this invention for providing a substantial photographic copy of the original material, and in which the copy may be full size, reduced, or enlarged. For this purpose, the material to be copied, which is shown at 218, is placed on the copy holder 85, which is adjusted to a horizontal position, and also adjusted vertically to the desired position, and a sheet of film or sensitized paper 219 is disposed in the film holder 205, which is adjusted horizontally for the desired size of the reproduction, and is also positioned to be disposed in a vertical plane, and at right angles to the light rays projected from the prism and lens system to the sensitized film or paper. The resulting image 220 will be an exact duplicate of the original material 218, but of course if desired the copy holder 85 and film holder 205 may be adjusted in such a manner as to provide an image 220 of an enlarged or reduced size.

Figure 16:
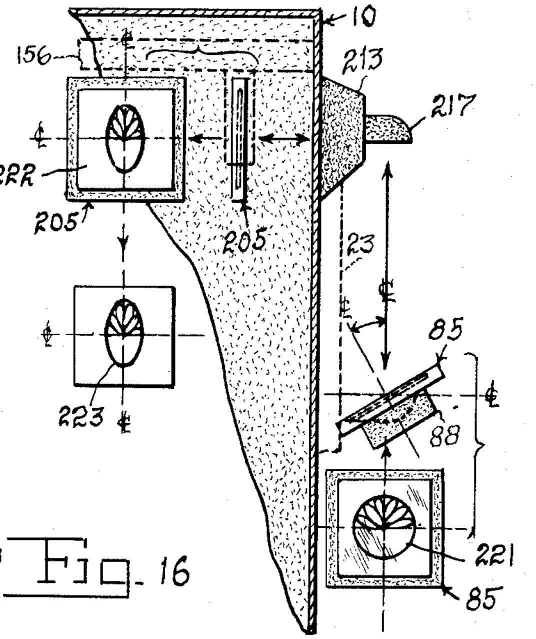

In FIG. 16, there is shown another effect which may be obtained, and in this case the original copy material 221 is in the form of a circular design, and such material is positioned on the copy holder 85 which is disposed at an angle about a horizontal axis, as clearly shown in FIG. 16. The film holder 205 having a sheet of sensitized film or paper 222 disposed therein is positioned in the same manner as previously shown in FIG. 15, or in other words in a vertical plane and at right angles to the light rays projected thereto from the prism and lens system, and as a result of the positioning of the copy holder 85, the resulting image 223 will be in the form of an ellipse, and the dimensions of such ellipse are determined by the angular position of the copy holder 85.

Figure 17:
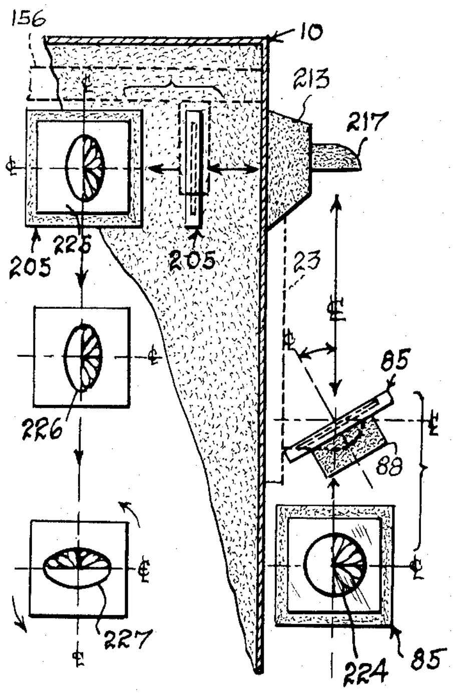

FIG. 17 illustrates an effect similar to FIG. 16, in which the original material to be copied is in the form of a circular design 224, and which of course may be oriented in any desired manner, and the original material is disposed on the copy holder 85, which once again is positioned at the desired angle about a horizontal axis. A sheet of sensitized film or paper 225 is positioned in the film holder 205, which is adjusted to lie in a vertical plane and at right angles to the light rays projected thereto from the prism and lens system, and the resulting image 226 will be in the form of an ellipse, and of course the resulting image may be conveniently altered as shown at 227 by orienting the same in a different position to provide an ellipse, but appearing as a horizontal instead of a vertical ellipse.

Figure 18:
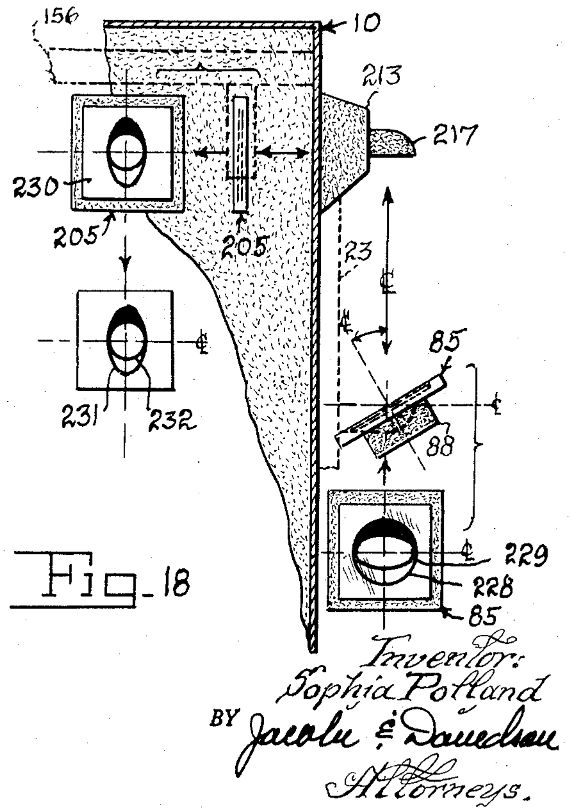

FIG. 18 illustrates the use of the apparatus for reproducing an original design which may consist of a circle 228 and an ellipse 229 within the circle 228, and such original material is disposed on the copy holder 85 which once again is adjusted to the desired angle about a horizontal axis, and a sheet of sensitized film or paper 230 in the film holder 205 positioned as in the previous illustrations provide a resulting image in which the circle 228 now becomes an ellipse 231, and the original ellipse 229 becomes a circle 232. Once again, of course, the final image may be oriented in any desired manner.

The above illustrations of the use of the apparatus of this invention result merely from orientation of the original material on the copy holder 85, as well as the adjustment of such copy holder about a horizontal axis, and of course these effects as well as many additional effects may be obtained by adjustment of the film holder 205 about a vertical axis, as well as about a horizontal axis, such adjustment being provided for in the manner as described previously. Consequently, the effects which may be obtained are substantially infinite, and are only limited by the imagination and creative talent of the operator.

*Film holder*

With particular reference to FIGS. 26 to 33, there is shown a film holder which may be utilized in connection with the above-described process camera, and such film holder 233 may well comprise generally rectangular frame side members 234 and 235, and end members 236 and 237. The film holder 233 serves to accommodate and support a transparent, film-supporting plate 236, which may be of glass, plastic, or other suitable material, and the film-supporting plate 236 may be fixed in the frame of the film holder 233, or may be secured in such a manner as to be removable therefrom for replacement or cleaning purposes. A pressure plate 237 is provided for maintaining one or more sheets of film or sensitized paper in intimate contact with the inner surface of the film-supporting plate 236, and the pressure plate 237 may be formed of a translucent or opaque material, as desired, but an opaque material is preferable, since this permits convenient positioning of the sheet of film, and also proper composition of the image to be formed on such film.

The pressure plate 237 may comprise a generally rectangular panel 238 mounted along one edge 239 by a suitable hinge means 240 on the end member 236, and while an elongated hinge 240 of the type commonly known as a "piano" hinge is shown, obviously two or more separate, shorter hinges may be employed for this purpose if desirable. The opposite edge 241 of the panel 238 terminates substantially midway between the end members 236 and 237 of the film forming the film holder 233. A removable bar 242 extends between the side members 234 and 235 overlying the panel 238, and spaced from the free edge 241 thereof. Spaced compression springs 243 and 244 are secured to the bar 242, and engage the panel 238 to yieldably hold the same in intimate contact with the film-supporting plate 236.

A second generally rectangular panel 245 is disposed between the free edge 241 of the panel 238, and the end member 237 of the film forming the film holder 233, and the free edge 246 of the second panel 245 is connected to the free edge 241 of the first panel 238 by suitable spring hinge means 247 and 248. Such spring hinge means 247 and 248 serves to resiliently urge the second panel 245 into intimate engagement with the film-supporting plate 236. Spaced detent means 249 and 250 is provided adjacent the other edge 251 of the second panel 245, and the detent means 249 and 250 releasably engage projections 252 on the end member 237 of the film holder 233 to releasably hold the second panel 245 in film-holding position. An operating handle 252 is provided on the second panel 245.

As clearly shown in FIG. 30, the second panel 245 may be conveniently operated to permit the insertion or removal of a sheet of film or sensitized paper 253 between the second panel 245 and the film-supporting plate 236, and for this purpose it is only necessary to move the second panel 245 about the hinge means 247 and 248 to permit removal or insertion of such sheet 253 with the second panel 245 being urged toward the plate 236 by the spring hinges 247 and 248, and releasably held in film-holding position by the detent means 249 and 250.

Spaced upstanding brackets 254 and 255 are provided on the second panel 245 at the free edge 246, and rotatably mounted on the brackets 254 and 255 are rollers 256 and 257. As clearly shown in FIG. 31, both panels 238 and 245 comprising the pressure plate 237 may be moved away from the film-supporting plate 236 in order to permit the insertion or removal of a relatively large sheet of film or sensitized paper 258. This is accomplished by moving the second panel 245 about the hinge means 247 and 248 a sufficient distance to bring the rollers 256 and 257 into engagement with the rod 242, which, as shown in FIG. 31, results in camming the first panel 238 about the hinge 240, and away from the film-supporting plate 236, in a manner to permit insertion or removal of the sheet of film or paper 258. By reason of this structure, the entire film holder 233 may be utilized, or only a portion thereof, depending on the size of the reproduction desired.

The particular structure of the film holder above described, by reason of the provision of the spaced compression springs 243 and 244, provides a uniform pressure of the first panel 238 against a sheet of film or paper disposed between such panel and the film-supporting plate 236, and also the spring hinges 247 and 248 in conjunction with the detent means 249 and 250 result in a uniform pressure of the second panel 245 against a sheet of film or paper disposed between such panel and the film-supporting plate 236. As described above, either or both panels comprising the pressure plate may be conveniently operated to move the same away from the film-supporting plate 236 to permit the insertion or removal of a sheet of film or sensitized paper. If desired, the pressure plate 237 may be provided with lines 259, or other suitable markings thereon, in order to facilitate accurate positioning of sheets of film or paper of various sizes, and also to facilitate composition of the image to be reproduced.

In FIGS. 34 to 42, there is shown a modified form of hinge mounting for the pressure plate 237, which permits convenient removal of the pressure plate from the film holder 233 for repair, replacement, or for any purpose, and also the removability of the pressure plate 237 permits the use of the film holder 233, in special cases, without the use of any pressure plate at all, in which case the sensitized film or paper would be secured in place in some other manner. Since the structure of the film holder shown in FIGS. 34 to 42, except for the hinge mounting of the pressure plate, is identical to that described above in connection with FIGS. 26 to 33, no further detailed description of the structure of the film holder will be given, but the following description will be limited to the specific hinge structure which permits removal of the pressure plate 237 from the film holder. For the purpose of hingedly mounting the pressure plate 237 on the frame of the film holder 233, there may be provided a bracket 260 secured to the side member 234 by screw-threaded fastening means or the like 261, and projecting inwardly from the bracket 260 is a pintle 262. In a similar manner, a bracket 263 is secured to the side member 235 of the film holder 233 by screw-threaded fastening means or the like 264, and projecting inwardly from the bracket 263 and in alignment with the pintle 262 is a pintle 265. It is to be noted that the pintle 265 is of somewhat greater length than the pintle 262. Also, as clearly shown in FIGS. 40, 41 and 42, the pintle 262 is provided at the inner end thereof with a reduced portion 266 which terminates in a shoulder 267.

Secured to the first panel 238 of the pressure plate 237 adjacent the edge 239 thereof are generally L-shaped hinge members 268 and 269, with one leg 270 and 271 thereof secured to the first panel 238 by screw-threaded fastening means or the like 272 and 273. The other leg 274 and 275 of each hinge member 268 and 269 extend outwardly away from the panel 238 of the pressure plate 237, and the leg 274 of the hinge member 268 is provided with an aperture of a size to be rotatably received on the reduced portion 266 of the pintle 262, while the leg 275 of the hinge member 269 is provided with an aperture of a size to be rotatably received on the pintle 265.

As best shown in FIGS. 34 to 38, the pressure plate 237 operates in the same manner as the pressure plate described above in connection with the form of film holder as shown in FIGS. 26 to 33, and when it is desired to remove the pressure plate 237 from the film holder 233, the cross bar 242 is removed from the side members 234 of the film holder 233, and the entire pressure plate 237 moved outwardly of the frame of the film holder 233 to the position shown in FIG. 39. At this time, the entire pressure plate 237 is moved transversely in the direction of the arrow 276 to the position shown in FIG. 40, at which time the leg 274 of the hinge member 268 is removed from the reduced portion 266 of the pintle 262. At this time the pressure plate 237 is titled in the direction of the arrow 277, as shown in FIG. 40, which movement is permitted by reason of the aperture in the leg 275 of the hinge member 269 being somewhat larger than the diameter of the pintle 265, and in this manner the hinge member 268 and the leg 274 thereof is displaced out of alignment with the pintle 262. From this position, the pressure plate 237 may be moved transversely in the opposite direction, as indicated by the arrow 278 in FIGS. 40 and 41, to the position shown in FIG. 41, at which time the hinge member 269 is removed from the pintle 265. As shown in FIG. 42, this permits complete removal of the pressure plate 237 from the film holder 233, and the pressure plate 237 may be reinstalled by proceeding in a manner opposite to that above described for the removal of the pressure plate. This removability of the pressure plate 237 from the film holder 233 represents an added convenience, but in no way affects the operation of the film holder and the pressure plate as described above in connection with the form of this portion of the invention shown in FIGS. 26 to 33.

It will be seen that by the above-described invention there has been provided a relatively simple, yet highly versatile process camera which may be utilized for a wide variety of photographic operations which may find particular application in the field of advertising, but which is in no way limited to this field, and furthermore, the process camera of this invention may be conveniently made available as a complete package unit which may be conveniently shipped and installed in any desired location and in a minimum of space, and furthermore, the apparatus is a complete operative unit in that no auxiliary equipment or structure is required for installation and operation thereof. It is further to be noted that the particular combination of novel features involving the structure and mounting of the copy holder and light source means, as well as the particular structure and mounting of the film holder, provides a process camera which by reason of the cooperation between these elements of the invention results in the great versatility of operation of which this invention is capable, and consequently, even though some of the features of this invention might find utility apart from the general structure thereof, nevertheless, in order to provide the results desired, it is necessary that these particular features be provided in combination, and in order that they may cooperate directly to produce the results of which the apparatus is capable.

It will be obvious to those skilled in the art that various changes may be made in the invention, without departing from the spirit and scope thereof, and therefore the invention is not limited by that which is shown in the drawings and described in the specification, but only as indicated in the appended claims.

What is claimed is:

1. For use in a process camera a generally rectangular vertically disposed frame, spaced parallel vertically disposed rods mounted within said frame, spaced parallel vertically disposed angle bars mounted on the outer surface of said frame, a copy holder carriage, spaced ears on said carriage, rollers on said ears engaging said rods to mount said carriage for vertical movement, an upper pair of pulleys adjacent said rods, a lower pair of pulleys adjacent said rods, a flexible member trained over said pulleys with a vertical run adjacent each rod and crossing and leading from the upper pulleys to the opposite lower pulleys, means securing each vertical run to the adjacent ear whereby said carriage is maintained horizontal, means for releasably locking said carriage in vertically adjusted position comprising oppositely movable lock bolts slidably mounted on said carriage, means on the outer ends of said bolts for frictionally engaging one flange of said angle bars, a rock plate pivotally mounted on said carriage, links connecting the inner ends of said bolts and said rock plate to provide a toggle actuating means, an actuating rod slidably mounted on said carriage and projecting from one side thereof, a hand engaging knob on the outer end and a link connecting the inner end of said actuating rod and said rock plate, spaced downwardly projecting latch fingers pivotally mounted on said carriage, said fingers having beveled lower ends and notches adjacent said ends, a link pivotally connected to one finger above the pivot and to the other finger below the pivot, a return spring connected to said one finger above the pivot and an abutment adjustably fixed on said actuating rod for engaging the end of said other finger above the pivot, said toggle means and abutment being so proportioned and adjusted that upon inward movement of said actuating rod said friction means will first be disengaged from said angle bars, further inward movement of said actuating rod serving to move the lower ends of said fingers outwardly, spaced parallel arms extending forwardly from said carriage, a generally rectangular copy holder having a supporting surface for receiving material to be photographed, trunnions mounting said copy holder on said arms for rotary movement about a horizontal axis parallel to the plane of said frame, a protractor on said copy holder adjacent one of said arms, an index on said one arm adjacent said protractor for indicating the angular position of said copy holder, manually operable means on one of said arms for releasably locking said copy holder in adjusted angular position, said supporting surface having a generally rectangular central opening therein, a box below said opening, a serpentine tubular light source in said box for projecting light rays through material disposed on said supporting surface, a light source carriage disposed below said copy holder carriage, spaced ears on said light source carriage, rollers on said last-named ears engaging said rods to mount said light source carriage for vertical movement, spaced locking rods slidably mounted on said light source carriage, means on one end of said locking rods for frictionally engaging the other flanges of said angle bars, lever means pivotally mounted on said light source carriage and engaging abutments on said locking rods, manual actuating means projecting from the front of said light source carriage and engaging said lever means and operable to disengage said last-named friction means, return spring means operably associated with said locking rods, pins on said light source carriage for engaging said notches to latch said carriages together for simultaneous vertical movement and disengageable for permitting independent vertical movement of said carriages, light source supporting frames slidably mounted on opposite sides of said light source carriage for movement in a horizontal plane and toward and away from said light source carriage, brackets extending upwardly from said supporting frames on opposite sides of said light source carriage, light source reflectors pivotally mounted on said brackets and independent counterbalancing means for each of said carriages disposed within said frame.

2. For use in a process camera a generally rectangular vertically disposed frame, spaced parallel vertically disposed rods mounted within said frame, spaced parallel vertically disposed angle bars mounted on the outer surface of said frame, a copy holder carriage, spaced ears on said carriage, rollers on said ears engaging said rods to mount said carriage for vertical movement, an upper pair of pulleys adjacent said rods, a lower pair of pulleys adjacent said rods, a flexible member trained over said pulleys with a vertical run adjacent each rod and crossing and leading from the upper pulleys to the opposite lower pulleys, means securing each vertical run to the adjacent ear whereby said carriage is maintained horizontal, means for releasably locking said carriage in vertically adjusted position comprising oppositely movable lock bolts slidably mounted on said carriage, means on the outer ends of said bolts for frictionally engaging one flange of said angle bars, a rock plate pivotally mounted on said carriage, links connecting the inner ends of said bolts and said rock plate to provide a toggle actuating means, an actuating rod slidably mounted on said carriage and projecting from one side thereof, a hand engaging knob on the outer end and a link connecting the inner end of said actuating rod and said rock plate, spaced downwardly projecting latch fingers pivotally mounted on said carriage, said fingers having beveled lower ends and notches adjacent said ends, a link pivotally connected to one finger above the pivot and to the other finger below the pivot, a return spring connected to said one finger above the pivot and an abutment adjustably fixed on said actuating rod for engaging the end of said other finger above the pivot, said toggle means and abutment being so proportioned and adjusted that upon inward movement of said actuating rod said friction means will first be disengaged from said angle bars, further inward movement of said actuating rod serving to move the lower ends of said fingers outwardly, spaced parallel arms extending forwardly from said carriage, a generally rectangular copy holder having a supporting surface for receiving material to be photographed, trunnions mounting said copy holder on said arms for rotary movement about a horizontal axis parallel to the plane of said frame, a protractor on said copy holder adjacent one of said arms, an index on said one arm adjacent said protractor for indicating the angular position of said copy holder, manually operable means on one of said arms for releasably locking said copy holder in adjusted angular position, said supporting surface having a generally rectangular central opening therein, a box below said opening, a light source in said box for projecting light rays through material disposed on said supporting surface, a light source carriage disposed below said copy holder carriage, spaced ears on said light source carriage, rollers on said last-named ears engaging said rods to mount said light source carriage for vertical movement, spaced locking rods slidably mounted on said light source carriage, means on one end of said locking rods for frictionally engaging the other flanges of said angle bars, lever means pivotally mounted on said light source carriage and engaging abutments on said locking rods, manual actuating means projecting from the front of said light source carriage and engaging said lever means and operable to disengage said last-named friction means, return spring means operably associated with said locking rods, pins on said light source carriage for engaging said notches to latch said carriages together for simultaneous vertical movement and disengageable for permitting independent vertical movement of said carriages, light source supporting frames slidably mounted on opposite sides of said light source carriage for movement in a horizontal plane toward and away from said light source carriage, brackets extending upwardly from said supporting frames on opposite sides of said light source carriage, light source reflectors pivotally mounted on said brackets and independent counterbalancing means for each of said carriages disposed within said frame.

3. For use in a process camera a generally rectangular vertically disposed frame, spaced parallel vertically disposed rods mounted within said frame, spaced parallel vertically disposed angle bars mounted on the outer surface of said frame, a copy holder carriage, spaced ears on said carriage, rollers on said ears engaging said rods to mount said carriage for vertical movement, an upper pair of pulleys adjacent said rods, a lower pair of pulleys adjacent said rods, a flexible member trained over said pulleys with a vertical run adjacent each rod and crossing and leading from the upper pulleys to the opposite lower pulleys, means securing each vertical run to the adjacent ear whereby said carriage is maitnained horizontal, means for releasably locking said carriage in vertically adjusted position comprising oppositely movable lock bolts slidably mounted on said carriage, means on the outer ends of said bolts for frictionally engaging one flange of said angle bars, a rock plate pivotally mounted on said carriage, links connecting the inner ends of said bolts and said rock plate to provide a toggle actuating means, an actuating rod slidably mounted on said carriage and projectng from one side thereof, a hand-engaging knob on the outer end and a link connecting the inner end of said actuating rod and said plate, spaced downwardly projecting latch fingers pivotally mounted on said carriage, said fingers having beveled lower ends and notches adjacent said ends, a link pivotally connected to one finger above the pivot and to the other finger below the pivot, a return spring connected to said one finger above the pivot and an abutment adjustably fixed on said actuating rod for engaging the end of said other finger above the pivot, said toggle means and abutment being so proportioned and adjusted that upon inward movement of actuating rod said friction means will first be disengaged from said angle bars, further inward movement of said actuating rod serving to move the lower ends of said fingers outwardly, spaced parallel arms extending forwardly from said carriage, a generally rectangular copy holder having a supporting surface for receiving material to be photographed, trunnions mounting said copy holder on said arms for rotary movement about a horizontal axis parallel to the plane of said frame, a protractor on said copy holder adjacent one of said arms, an index on said one arm adjacent said protractor for indicating the angular position of said copy holder, manually operable means on one of said arms for releasably locking said copy holder in adjusted angular position, a light source carriage disposed below said copy holder carriage, spaced ears on said light source carriage, rollers on said last-named ears engaging said rods to mount said light source carriage for vertical movement, spaced locking rods slidably mounted on said light source carriage, means on one end of said locking rods for frictionally engaging the other flanges of said angle bars, lever means pivotally mounted on said light source carriage and engaging abutments on said locking rods, manual actuating means projecting from the front of said light source carriage and engaging said lever means and operable to disengage said last-named friction means, return spring means operably associated with said locking rods, pins on said light source carriage for engaging said notches to latch said carriages together for simultaneous vertical movement and disengageable for permitting independent vertical movement of said carriages, light source supporting frames slidably mounted on opposite sides of said light source carriage for movement in a horizontal plane toward and away from said light source carriage, brackets extending upwardly from said supporting frames on opposite sides of said light source carriage, light source reflectors pivotally mounted on said brackets and independent counterbalancing means for each of said carriages disposed within said frame.

4. For use in a process camera a generally rectangular vertically disposed frame, spaced parallel vertically disposed rods mounted within said frame, spaced parallel vertically disposed angle bars mounted on the outer surface of said frame, a copy holder carriage, spaced ears on said carriage, rollers on said ears engaging said rods to mount said carriage for vertical movement, means for maintaining said carriage horizontal, means for releasably locking said carriage in vertically adjusted position comprising oppositely movable lock bolts slidably mounted on said carriage, means on the outer ends of said bolts for frictionally engaging one flange of said angle bars, a rock plate pivotally mounted on said carriage, links connecting the inner ends of said bolts and said rock plate to provide a toggle actuating means, an actuating rod slidably mounted on said carriage and projecting from one side thereof, a hand-engaging knob on the outer end and a link connecting the inner end of said actuating rod and said rock plate, spaced downwardly projecting latch fingers pivotally mounted on said carriage, said fingers having beveled lower ends and notches adjacent said ends, a link pivotally connected to one finger above the pivot and to the other finger below the pivot, a return spring connected to said one finger above the pivot and an abutment adjustably fixed on said actuating rod for engaging the end of said other finger above the pivot, said toggle means and abutment being so proportioned and adjusted that upon inward movement of said actuating rod, said friction means will first be disengaged from said angle bars, further inward movement of said actuating rod serving to move the lower ends of said fingers outwardly, spaced parallel arms extending forwardly from said carriage, a generally rectangular copy holder having a supporting surface for receiving material to be photographed, trunnions mounting said copy holder on said arms for rotary movement about a horizontal axis parallel to the plane of said frame, a protractor on said copy holder adjacent one of said arms, an index on said one arm adjacent said protractor for indicating the angular position of said copy holder, manually operable means on one of said arms for releasably locking said copy holder in adjusted angular position, a light source carriage disposed below said copy holder carriage, spaced ears on said light source carriage, rollers on said last-named ears engaging said rods to mount said light source carriage for vertical movement, spaced locking rods slidably mounted on said light source carriage, means on one end of said locking rods for frictionally engaging the other flanges of said angle bars, lever means pivotally mounted on said light source carriage and engaging abutments on said locking rods, manual actuating means projecting from the front of said light source carriage and engaging said lever means and operable to disengage said last-named friction means, return spring means operably associated with said locking rods, pins on said light source carriage for engaging said notches to latch said carriages together for simultaneous vertical movement and disengageable for permitting independent vertical movement of said carriage, light source supporting frames slidably mounted on opposite sides of said light source carriage for movement in a horizontal plane toward and away from said light source carriage, brackets extending upwardly from said supporting frames on opposite sides of said light source carriage, light source reflectors pivotally mounted on said brackets and independent counterbalancing means for each of said carriages disposed within said frame.

5. For use in a process camera a generally rectangular vertically disposed frame, spaced parallel vertically disposed rods mounted within said frame, spaced parallel vertically disposed angle bars mounted on the outer surface of said frame, a copy holder carriage, spaced ears on said carriage, rollers on said ears engaging said rods to mount said carriage for vertical movement, means for maintaining said carriage horizontal, means for releasably locking said carriage in vertically adjusted position comprising oppositely movable lock bolts slidably mounted on said carriage, means on the outer ends of said bolts for frictionally engaging one flange of said angle bars, a rock plate pivotally mounted on said carriage, links connecting the inner ends of said bolts and said rock plate to provide a toggle actuating means, an actuating rod slidably mounted on said carriage and projecting from one side thereof, a hand-engaging knob on the outer end and a link connecting the inner end of said actuating rod and said rock plate, spaced downwardly projecting latch fingers pivotally mounted on said carriage, said fingers having beveled lower ends and notches adjacent said ends, a link pivotally connected to one finger above the pivot and to the other finger below the pivot, a return spring connected to said one finger above the pivot and an abutment adjustably fixed on said actuating rod for engaging the end of said other finger above the pivot, said toggle means and abutment being so proportioned and adjusted that upon inward movement of said actuating rod said friction means will first be disengaged from said angle bars, further inward movement of said actuating rod serving to move the lower ends of said fingers outwardly, spaced parallel arms extending forwardly from said carriage, a generally rectangular copy holder having a supporting surface for receiving material to be photographed, trunnions mounting said copy holder on said arms for rotary movement about a horizontal axis parallel to the plane of said frame, means for indicating the angular position of said copy holder, manually operable means on one of said arms for releasably locking said copy holder in adjusted angular position, a light source carriage disposed below said copy holder carriage, spaced ears on said light source carriage, rollers on said last-named ears engaging said rod to mount said light source carriage for vertical movement, spaced locking rods slidably mounted on said light source carriage, means on one end of said locking rods for frictionally engaging the other flanges of said angle bars, lever means pivotally mounted on said light source carriage and engaging abutments on said locking rods, manual actuating means projecting from the front of said light source carriage and engaging said lever means and operable to disengage said last-named friction means, return spring means operably associated with said locking rods, pins on said light source carriage for engaging said notches to latch said carriages together for simultaneous vertical movement and disengageable for permitting independent vertical movement of said carriages, light source supporting frames slidably mounted on opposite sides of said light source carriage for movement in a horizontal plane toward and away from said light source carriage, brackets extending upwardly from said supporting frames on opposite sides of said light source carriage, light source reflectors pivotally mounted on said brackets and independent counter-balancing means for each of said carriages disposed within said frame.

6. For use in a process camera a generally rectangular vertically disposed frame, spaced parallel vertically disposed rods mounted within said frame, spaced parallel vertically disposed angle bars mounted on the outer surface of said frame, a copy holder carriage, rollers on said carriage engaging said rods to mount said carriage for vertical movement, means for maintaining said carriage horizontal, means for releasably locking said carriage in vertically adjusted position comprising oppositely movable lock bolts slidably mounted on said carriage, means on the outer ends of said bolts for frictionally engaging one flange of said angle bars, a rock plate pivotally mounted on said carriage, links connecting the inner ends of said bolts and said rock plate to provide a toggle actuating means, an actuating rod slidably mounted on said carriage and projecting from one side thereof, a hand-engaging knob on the outer end and a link connecting the inner end of said actuating rod and said rock plate, spaced downwardly projecting latch fingers pivotally mounted on said carriage, said fingers having beveled lower ends and notches adjacent said ends, a link pivotally connected to one finger above the pivot and to the other finger below the pivot, a return spring connected to said one finger above the pivot and an abutment adjustably fixed on said actuating rod for engaging the end of said other finger above the pivot, said toggle means and abutment being so proportioned and adjusted that upon inward movement of said actuating rod said friction means will first be disengaged from said angle bars, further inward movement of said actuating rod serving to move the lower ends of said fingers outwardly, spaced parallel arms extending forwardly from said carriage, a generally rectangular copy holder having a supporting surface for receiving material to be photographed, trunnions mounting said copy holder on said arms for rotary movement about a horizontal axis parallel to the plane of said frame, means for indicating the angular position of said copy holder, manually operable means on one of said arms for releasably locking said copy holder in adjusted angular position, a light source carriage disposed below said copy holder carriage, rollers on said light source engaging said rods to mount said light source carriage for vertical movement, spaced locking rods slidably mounted on said light source carriage, means on one end of said locking rods for frictionally engaging the other flanges of said angle bars, lever means pivotally mounted on said light source carriage and engaging abutments on said locking rods, manual actuating means projecting from the front of said light source carriage and engaging said lever means and operable to disengage said last-named friction means, return spring means operably associated with said locking rods, pins on said light source carriage for engaging said notches to latch said carriages together for simultaneous vertical movement and disengageable for permitting independent vertical movement of said carriages, light source supporting frames slidably mounted on opposite sides of said light source carriage for movement in a horizontal plane toward and away from said light source carriage, brackets extending upwardly from said supporting frames on opposite sides of said light source carriage, light source reflectors pivotally mounted on said brackets and independent counter-balancing means for each of said carriages disposed within said frame.

7. For use in a process camera a generally rectangular vertically disposed frame, spaced parallel vertically disposed rods mounted within said frame, spaced parallel vertically disposed angle bars mounted on the outer surface of said frame, a copy holder carriage, rollers on said carriage engaging said rods to mount said carriage for vertical movement, means for maintaining said carriage horizontal, means for releasably locking said carriage in vertically adjusted position comprising oppositely movable lock bolts slidably mounted on said carriage, means on the outer ends of said bolts for frictionally engaging one flange of said angle bars, a rock plate pivotally mounted on said carriage, links connecting the inner ends of said bolts and said rock plate to provide a toggle actuating means, an actuating rod slidably mounted on said carriage and projecting from one side thereof, a hand-engaging knob on the outer end and a link connecting the inner end of said actuating rod and said rock plate, spaced downwardly projecting latch fingers pivotally mounted on said carriage, said fingers having beveled lower ends and notches adjacent said ends, a link pivotally connected to one finger above the pivot and to the other finger below the pivot, a return spring connected to said one finger above the pivot and an abutment adjustably fixed on said actuating rod for engaging the end of said other finger above the pivot, said toggle means and abutment being so proportioned and adjusted that upon inward movement of said actuating rod said friction means will first be disengaged from said angle bars, further inward movement of said actuating rod serving to move the lower ends of said fingers outwardly, spaced parallel arms extending forwardly from said carriage, a generally rectangular copy holder having a supporting surface for receiving material to be photographed, trunnions mounting said copy holder on said arms for rotary movement about a horizontal axis parallel to the plane of said frame, means for indicating the angular position of said copy holder, manually operable means on one of said arms for releasably locking said copy holder in adjusted angular position, a light source carriage disposed below said copy holder carriage, rollers on said light source carriage engaging said rods to mount said light source carriage for vertical movement, spaced locking rods slidably mounted on said light source carriage, means on one end of said locking rod for frictionally engaging the other flanges of said angle bars, lever means pivotally mounted on said light source carriage and engaging abutments on said locking rods, manual actuating means projecting from the front of said light source carriage and engaging said lever means and operable to disengage said last-named friction means, return spring means operably associated with said locking rods, pins on said light source carriage for engaging said notches to latch said carriages together for simultaneous vertical movement and disengagable for permitting independent vertical movement of said carriages, brackets extending upwardly from opposite sides of said light source carriage, light source reflectors mounted on said brackets and independent counter-balancing means for each of said carriages disposed within said frame.

8. For use in a process camera a generally rectangular vertically disposed frame, spaced parallel vertically disposed rods mounted within said frame, a copy holder carriage, rollers on said carriage engaging said rods to mount said carriage for vertical movement, means for maintaining said carriage horizontal, means for releasably locking said carriage in vertically adjusted position comprising oppositely movable lock bolts slidably mounted on said carriage, means on the outer ends of said bolts for frictionally engaging said frame, a rock plate pivotally mounted on said carriage, links connecting the inner ends of said bolts and said rock plate to provide a toggle actuating means, an actuating rod slidably mounted on said carriage and projecting from one side thereof, a hand-engaging knob on the outer end and a link connecting the inner end of said actuating rod and said rock plate, spaced downwardly projecting latch fingers pivotally mounted on said carriage, said fingers having beveled lower ends and notches adjacent said ends, a link pivotally connected to one finger above the pivot and to the other finger below the pivot, a return spring connected to said one finger above the pivot and an abutment adjustably fixed on said actuating rod for engaging the end of said other finger above the pivot, said toggle means and abutment being so proportioned and adjusted that upon inward movement of said actuating rod said friction means will first be disengaged from said frame, further inward movement of said actuating rod serving to move the lower ends of said fingers outwardly, spaced parallel arms extending forwardly from said carriage, a generally rectangular copy holder having a supporting surface for receiving material to be photographed, trunnions mounting said copy holder on said arms for rotary movement about a horizontal axis parallel to the plane of said frame, means for indicating the angular position of said copy holder, manually operable means on one of said arms for releasably locking said copy holder in adjusted angular position, a light source carriage disposed below said copy holder carriage, rollers on said light source carriage engaging said rods to mount said light source carriage for vertical movement, spaced locking rods slidably mounted on said light source carriage, means on one end of said locking rods for frictionally engaging said frame, lever means pivotally mounted on said light source carriage and engaging abutments on said locking rods, manual actuating means projecting from the front of said light source carriage and engaging said lever means and operable to disengage said last-named friction means, return spring means operably associated with said locking rods, pins on said light source carriage for engaging said notches to latch said carriages together for simultaneous vertical movement and disengageable for permitting independent vertical movement of said carriages, brackets extending upwardly from opposite sides of said light source carriage, light source reflectors mounted on said brackets and independent counter-balancing means for each of said carriages disposed within said frame.

9. For use in a process camera a generally rectangular vertically disposed frame, spaced parallel vertically disposed rods mounted within said frame, a copy holder carriage, rollers on said carriage engaging said rods to mount said carriage for vertical movement, means for maintaining said carriage horizontal, means for releasably locking said carriage in vertically adjusted position comprising oppositely movable lock bolts slidably mounted on said carriage, means on the outer ends of said bolts for frictionally engaging said frame, a rock plate pivotally mounted on said carriage, links connecting the inner ends of said bolts and said rock plate to provide a toggle actuating means, an actuating rod slidably mounted on said carriage and projecting from one side thereof, a hand-engaging knob on the outer end and a link connecting the inner end of said actuating rod and said rock plate, spaced downwardly projecting latch fingers pivotally mounted on said carriage, said fingers having beveled lower ends and notches adjacent said ends, a link pivotally connected to one finger above the pivot and to the other finger below the pivot, a return spring connected to said one finger above the pivot and an abutment adjustably fixed on said actuating rod for engaging the end of said other finger above the pivot, said toggle means and abutment being so proportioned and adjusted that upon inward movement of said actuating rod said friction means will first be disengaged from said frame, further inward movement of said actuating rod serving to move the lower ends of said fingers outwardly, spaced parallel arms extending forwardly from said carriage, a generally rectangular copy holder having a supporting surface for receiving material to be photographed, trunnions mounting said copy holder on said arms foi rotary movement about a horizontal axis parallel to the plane of said frame, means for indicating the angular position of said copy holder, manually operable means on one of said arms for releasably locking said copy holder in adjusted angular position, a light source carriage disposed below said copy holder carriage, rollers on said light source carriage engaging said rod to mount said light source carriage for vertical movement, spaced locking rods slidably mounted on said light source carriage, means on one end of said locking rods for frictionally engaging said frame, lever means pivotally mounted on said light source carriage and engaging abutments on said locking rods, manual actuating means projecting from the front of said light source carriage and engaging said lever means and operable to disengage said last-named friction means, return spring means operably associated with said locking rods, pins on said light source carriage for engaging said notches to latch said carriages together for simultaneous vertical movement and disengageable for permitting independent vertical movement of said carriages, brackets extending upwardly from opposite sides of said light source carriage and light source reflectors mounted on said brackets.

10. For use in a process camera a generally rectangular vertically disposed frame, spaced parallel vertically disposed rods mounted within said frame, a copy holder carriage, rollers on said carriage engaging said rods to mount said carriage for vertical movement, means for maintaining said carriage horizontal, means for releasably locking said carriage in vertically adjusted position comprising oppositely movable lock bolts slidably mounted on said carriage, means on the outer ends of said bolts for frictionally engaging said frame, a rock plate pivotally mounted on said carriage, links connecting the inner ends of said bolts and said rock plate to provide a toggle actuating means, an actuating rod slidably mounted on said carriage and projecting from one side thereof, a hand-engaging knob on the outer end and a link connecting the inner end of said actuating rod and said rock plate, spaced downwardly projecting latch fingers pivotally mounted on said carriage, said fingers having beveled lower ends and notches adjacent said ends, a link pivotally connected to one finger above the pivot and to the other finger below the pivot, a return spring connected to said one finger above the pivot and an abutment adjustably fixed on said actuating rod for engaging the end of said other finger above the pivot, said toggle means and abutment being so proportioned and adjusted that upon inward movement of said actuating rod said friction means will first be disengaged from said frame, further inward movement of said actuating rod serving to move the lower ends of said fingers outwardly, spaced parallel arms extending forwardly from said carriage, a generally rectangular copy holder having a supporting surface for receiving material to be photographed, trunnions mounting said copy holder on said arms for rotary movement about a horizontal axis parallel to the plane of said frame, means for indicating the angular position of said copy holder, means for releasably locking said copy holder in adjusted angular position, a light source carriage disposed below said copy holder carriage, rollers on said light source carriage engaging said rods to mount said light source carriage for vertical movement, spaced locking rods slidably mounted on said light source carriage, means on one end of said locking rods for frictionally engaging said frame, lever means pivotally mounted on said light source carriage and engaging abutments on said locking rods, manual actuating means projecting from the front of said light source carriage and engaging said lever means and operable to disengage said last-named friction means, return spring means operably associated with said locking rods, pins on said light source carriage for engaging said notches to latch said carriages together for simultaneous vertical movement and disengageable for permitting independent vertical movement of said carriages, brackets extending upwardly from opposite sides of said light source carriage and light source reflectors mounted on said brackets.

11. For use in a process camera a generally rectangular vertically disposed frame, spaced parallel vertically disposed rods mounted within said frame, a copy holder carriage, rollers on said carriage engaging said rods to mount said carriage for vertical movement, means for releasably locking said carriage in vertically adjusted position comprising oppositely movable lock bolts slidably mounted on said carriage, means on the outer ends of said bolts for frictionally engaging said frame, a rock plate pivotally mounted on said carriage, links connecting the inner ends of said bolts and said rock plate to provide a toggle actuating means, an actuating rod slidably mounted on said carriage and projecting from one side thereof, a hand-engaging knob on the outer end and a link connecting the inner end of said actuating rod and said rock plate, spaced downwardly projecting latch fingers pivotally mounted on said carriage, said fingers having beveled lower ends and notches adjacent said ends, a link pivotally connected to one finger above the pivot and to the other finger below the pivot, a return spring connected to said one finger above the pivot and an abutment adjustably fixed on said actuating rod for engaging the end of said other finger above the pivot, said toggle means and abutment being so proportioned and adjusted that upon inward movement of said actuating rod said friction means will first be disengaged from said frame, further inward movement of said actuating rod serving to move the lower ends of said fingers outwardly, spaced parallel arms extending forwardly from said carriage, a generally rectangular copy holder having a supporting surface for receiving material to be photographed, trunnions mounting said copy holder on said arms for rotary movement about a horizontal axis parallel to the plane of said frame, means for indicating the angular position of said copy holder, means for releasably locking said copy holder in adjusted angular position, a light source carriage disposed below said copy holder carriage, rollers on said light source carriage engaging said rods to mount said light source carriage for vertical movement, spaced locking rods slidably mounted on said light source carriage, means on one end of said locking rods for frictionally engaging said frame, lever means pivotally mounted on said light source carriage and engaging abutments on said locking rods, manual actuating means projecting from the front of said light source carriage and engaging said lever means and operable to disengage said last-named friction means, return spring means operably associated with said locking rods, pins on said light source carriage for engaging said notches to latch said carriages together for simultaneous vertical movement and disengageable for permitting independent vertical movement of said carriages, brackets extending upwardly from opposite sides of said light source carriage and light source reflectors mounted on said brackets.

12. For use in a process camera a generally rectangular vertically disposed frame, a copy holder carriage, means to mount said carriage on said frame for vertical movement, means for releasably locking said carriage in vertically adjusted position comprising oppositely movable lock bolts slidably mounted on said carriage, means on the outer ends of said bolts for frictionally engaging said frame, a rock plate pivotally mounted on said carriage, links connecting the inner ends of said bolts and said rock plate to provide a toggle actuating means, an actuating rod slidably mounted on said carriage and projecting from one side thereof, a hand-engaging knob on the outer end and a link connecting the inner end of said actuating rod and said rock plate, spaced downwardly projecting latch fingers pivotally mounted on said carriage, said fingers having beveled lower ends and notches adjacent said ends, a link pivotally connected to one finger above the pivot and to the other finger below the pivot, a return spring connected to said one finger above the pivot and an abutment adjustably fixed on said actuating rod for engaging the end of said other finger above the pivot, said toggle means and abutment being so proportioned and adjusted that upon inward movement of said actuating rod said friction means will first be disengaged from said frame, further inward movement of said actuating rod serving to move the lower ends of said fingers outwardly, spaced parallel arms extending forwardly from said carriage, a generally rectangular copy holder having a supporting surface for receiving material to be photographed, trunnions mounting said copy holder on said arms for rotary movement about a horizontal axis parallel to the plane of said frame, means for indicating the angular position of said copy holder, means for releasably locking said copy holder in adjusted angular position, a light source carriage disposed below said copy holder carriage, means to mount said light source carriage on said frame for vertical movement, spaced locking rods slidably mounted on said light source carriage, means on one end of said locking rods for frictionally engaging said frame, lever means pivotally mounted on said light source carriage and engaging abutments on said locking rods, manual actuating means projecting from the front of said light source carriage and engaging said lever means and operable to disengage said last-named friction means, return spring means operably associated with said locking rods, pins on said light source carriage for engaging said notches to latch said carriages together for simultaneous vertical movement and disengageable for permitting independent vertical movement of said carriages, brackets extending upwardly from said light source carriage and light source reflectors mounted on said brackets.

13. For use in a process camera a generally rectangular vertically disposed frame, a copy holder carriage, means to mount said carriage on said frame, toggle actuating means, an actuating rod slidably mounted on said carriage and projecting from one side thereof, a hand-engaging knob on the outer end and a link connecting the inner end of said actuating rod and said rock plate, spaced downwardly projecting latch fingers pivotally mounted on said carriage, said fingers having beveled lower ends and notches adjacent said ends, a link pivotally connected to one finger above the pivot and to the other finger below the pivot, a return spring connected to said one finger above the pivot and an abutment adjustably fixed on said actuating rod for engaging the end of said other finger above the pivot, said toggle means and abutment being so proportioned and adjusted that upon inward movement of said actuating rod said carriage mounting means will first be disengaged from said frame, further inward movement of said actuating rod serving to move the lower ends of said fingers outwardly, a generally rectangular copy holder having a supporting surface for receiving material to be photographed, means mounting said copy holder on said carriage for rotary movement about a horizontal axis parallel to the plane of said frame, means for indicating the angular position of said copy holder, means for releasably locking said copy holder in adjusted angular position, a light source carriage disposed below said copy holder carriage, means to mount said light source carriage on said frame for vertical movement, spaced locking rods slidably mounted on said light source carriage, means on one end of said locking rods for frictionally engaging said frame, lever means pivotally mounted on said light source carriage and engaging abutments on said locking rods, manual actuating means projecting from the front of said light source carriage and engaging said lever means and operable to disengage said last-named friction means, return spring means operably associated with said locking rods, pins on said light source carriage for engaging said notches to latch said carriages together for simultaneous vertical movement and disengageable for permitting independent vertical movement of said carriages, brackets extending upwardly from said light source carriage and light source reflectors mounted on said brackets.

14. For use in a process camera a generally rectangular vertically disposed frame, a copy holder carriage, means to mount said carriage on said frame for vertical movement, means for releasably locking said carriage in vertically adjusted position comprising oppositely movable lock bolts slidably mounted on said carriage, means on the outer ends of said bolts for frictionally engaging said frame, a rock plate pivotally mounted on said carriage, links connecting the inner ends of said bolts and said rock plate to provide a toggle actuating means, an actuating rod slidably mounted on said carriage and projecting from one side thereof, a link connecting said actuating rod and said rock plate, spaced downwardly projecting latch fingers pivotally mounted on said carriage, said fingers having beveled lower ends and notches adjacent said ends, a link pivotally connected to one finger above the pivot and to the other finger below the pivot, a return spring connected to said finger above the pivot and an abutment adjustably fixed on said actuating rod for engaging the end of said other finger above the pivot, said toggle means and abutment being so proportioned and adjusted that upon inward movement of said actuating rod said friction means will first be disengaged from said frame, further inward movement of said actuating rod serving to move the lower ends of said fingers outwardly, a generally rectangular copy holder having a supporting surface for receiving material to be photographed, means mounting said copy holder on said carriage for rotary movement about a horizontal axis parallel to the plane of said frame, means for indicating the angular position of said copy holder, means for releasably locking said copy holder in adjusted angular position, a light source carriage disposed below said copy holder carriage, means to mount said light source carriage on said frame for vertical movement, spaced locking rods slidably mounted on said light source carriage, means on one end of said locking rods for frictionally engaging said frame, lever means pivotally mounted on said light source carriage and engaging abutments on said locking rods, manual actuating means engaging said lever means and operable to disengage said last-named friction means, return spring means operably associated with said locking rods, pins on said light source carriage for engaging said notches to latch said carriages together for simultaneous vertical movement and disengageable for permitting independent vertical movement of said carriages, brackets extending upwardly from said light source carriage and light source reflectors mounted on said brackets.

15. For use in a process camera a generally rectangular vertically disposed frame, a copy holder carriage, means to mount said carriage on said frame for vertical movement, means for releasably locking said carriage in vertically adjusted position, a generally rectangular copy holder having a supporting surface for receiving material to be photographed, means mounting said copy holder on said carriage for rotary movement about a horizontal axis parallel to the plane of said frame, means for indicating the angular position of said copy holder, means for releasably locking said copy holder in adjusted angular position, a light source carriage disposed below said copy holder carriage, means to mount said light source carriage on said frame for vertical movement, means to releasably lock said light source carriage in adjusted position, means to latch said carriages together for simultaneous vertical movement and disengageable for permitting independent vertical movement of said carriages, brackets extending upwardly from said light source carriage and light source reflectors mounted on said brackets.

References Cited by the Examiner

UNITED STATES PATENTS

| | | | |
|---|---|---|---|
| 466,000 | 12/91 | Barker | 95—77 |
| 467,423 | 1/92 | Merritt | 296—26 |
| 1,695,481 | 12/28 | Caps | 88—24 |
| 2,397,010 | 3/46 | Jacobson | 95—100 |
| 2,431,217 | 11/47 | Waldorf | 88—24 |
| 2,796,812 | 6/57 | Koci | 88—24 |
| 2,804,002 | 8/57 | Simpson | 95—85 |
| 2,824,491 | 2/58 | Hoffmaster | 88—24 |
| 2,846,920 | 8/58 | Friedel | 88—24 |
| 3,053,007 | 9/62 | Goodwin | 45—86 |

EVON C. BLUNK, *Primary Examiner.*

EMIL G. ANDERSON, WILLIAM MISIEK, *Examiners.*